US012034620B2

(12) United States Patent
Mahadevan et al.

(10) Patent No.: US 12,034,620 B2
(45) Date of Patent: Jul. 9, 2024

(54) FORWARD ERROR CORRECTION

(71) Applicant: Nokia Solutions and Networks Oy, Espoo (FI)

(72) Inventors: Amitkumar Mahadevan, Edison, NJ (US); Doutje Van Veen, New Providence, NJ (US); Noriaki Kaneda, Westfield, NJ (US); Vincent Houtsma, New Providence, NJ (US); Paul Cautereels, Hingene (BE); Carl Mertens, Brasschaat (BE); Michael Fivez, Antwerp (BE)

(73) Assignee: Nokia Solutions and Networks Oy, Espoo (FI)

( * ) Notice: Subject to any disclaimer, the term of this patent is extended or adjusted under 35 U.S.C. 154(b) by 779 days.

(21) Appl. No.: 16/811,405

(22) Filed: Mar. 6, 2020

(65) Prior Publication Data
US 2021/0281501 A1 Sep. 9, 2021

(51) Int. Cl.
*H04L 43/0823* (2022.01)
*G06F 30/20* (2020.01)
(Continued)

(52) U.S. Cl.
CPC .......... *H04L 43/0847* (2013.01); *G06F 30/20* (2020.01); *H03M 13/1102* (2013.01); *G06F 2111/10* (2020.01)

(58) Field of Classification Search
None
See application file for complete search history.

(56) References Cited

U.S. PATENT DOCUMENTS 9,209,897 B2 12/2015 Amitai et al.
9,564,921 B1 * 2/2017 Graumann ........ H03M 13/3715
(Continued)

FOREIGN PATENT DOCUMENTS

WO  WO 2019/169373  9/2019

OTHER PUBLICATIONS

"Modeling Burst Channels Using Partitioned Fritchman's Markov Models"—IEEE Transactions on Vehicular Technology; XP011063742. (Year: 1998).*

(Continued)

*Primary Examiner* — Jeffrey M Rutkowski
*Assistant Examiner* — Mehedi S Aley
(74) *Attorney, Agent, or Firm* — Tong, Rea, Bentley & Kim, LLC

(57) ABSTRACT

Various example embodiments for supporting forward error correction (FEC) in a communication system are presented. Various example embodiments for supporting FEC in a communication system may include selection of a FEC setting (e.g., an amount of puncturing and/or shortening of a FEC code, a FEC code, or the like) for a communication channel from a transmitter to a receiver based on channel characteristic information of the communication channel from the transmitter to the receiver (e.g., transfer function information, channel loss information, noise characteristic information, error information (e.g., bit error rate, error modeling, or the like), or the like). Various example embodiments for supporting FEC in a communication system, based on selection of a FEC setting for a communication channel based on channel characteristic information of the communication channel, may be applied within various types of communication systems, including various types of wired and/or wireless communication systems.

17 Claims, 7 Drawing Sheets

(51) Int. Cl.
H03M 13/11 (2006.01)
G06F 111/10 (2020.01)

(56) References Cited

U.S. PATENT DOCUMENTS

| | | | |
|---|---|---|---|
| 2009/0190492 A1* | 7/2009 | Khayam | H04L 1/0072 370/252 |
| 2010/0316381 A1 | 12/2010 | De Lind van Wijngaarden | |
| 2012/0060070 A1* | 3/2012 | Stark | H03M 13/31 714/752 |
| 2013/0156420 A1* | 6/2013 | Amitai | H04L 1/0009 398/27 |
| 2013/0251362 A1 | 9/2013 | Li et al. | |
| 2014/0133848 A1 | 5/2014 | Koike-Akino et al. | |
| 2017/0132077 A1 | 5/2017 | Wu et al. | |
| 2018/0269972 A1 | 9/2018 | Djordjevic et al. | |
| 2019/0174212 A1 | 6/2019 | Detwiler et al. | |
| 2019/0181937 A1 | 6/2019 | Nammi | |
| 2020/0120510 A1* | 4/2020 | Gresset | B61L 27/70 |
| 2020/0136885 A1* | 4/2020 | Zuo | H04L 25/4975 |
| 2021/0050939 A1* | 2/2021 | Wey | H04Q 11/00 |
| 2022/0231771 A1* | 7/2022 | Sugiyama | H04B 17/309 |

OTHER PUBLICATIONS

Cecilio ("Modeling Burst Channels Using Partitioned Fritchman's Markov Models"—IEEE Transactions on Vehicular Technology; XP011063742; (Year: 1998).*
Cecilio "Modelling Burst Channels Using Partitioned Fritchman"s Markov Models (Year: 1998).*
IEEE Standards Association, "IEEE Standard for Information Technology—Telecommunications and Information Exchange Between Systems—Local and Metropolitan Networks—Specific Requirements—Part 11: Wireless LAN Medium Access Control (MAC) and Physical Layer Specifications," IEEE Std 802.11-2016, Dec. 7, 2016, 3534 pages.
Extended European Search Report in corresponding EP Application No. 21160726.2-1216, dated Jul. 2021, 8 pages.
Pimental, et al., "Modeling Burst Channels Using Partitioned Fritchman's Markov Models," IEEE Transactions on Vehicular Technology, vol. 47, No. 3, Aug. 1, 1998.
Gho, G., et al., "Rate-Adaptive Coding for Optical Fiber Transmission Systems," Journal of Lightwave Technology, vol. 29, No. 2, Jan. 15, 2011, pp. 222-233.
Koike-Akino, T., et al., "Rate-Adaptive LDPC Convolutional Coding with Joint Layered Scheduling and Shortening Design," Mitsubishi Electric Research Laboratories, Optical Fiber Communication Conference and Exposition and the National Fiber Optic Engineers Conference (OFC/NFOEC), TR 2018-015, Mar. 2018, 4 pages.
Van Veen, D., et al., "FEC code for 25/50/100G EPON," IEEE P802.3CA 100G-EPON Task Force Meeting, Vancouver, Canada, Mar. 2017, 16 pages.
Zhao, D., et al., "Adaptive Rate-Compatible Non-Binary LDPC Coding Scheme for the B5G Mobile System," Sensors 2019, v19(5), 1067; doi:10.3390/s1051067, Mar. 2, 2019, 28 pages.
Li, C., et al., "Flexible Coherent PON System Based on Cost-Effective Heterodyne Detection of PDM-PAM-n Signal," 2016 IEEE/CIC International Conference on Communication in China (ICCC), Chengdu, Jul. 27, 2016, pp. 1-4.
Fritchman, B., "A Binary Channel Characterization Using Partitioned Markov Chains," IEEE Transactions on Information Theory, vol. IT-13, No. 2, Apr. 1967, pp. 221-227.
Van Veen, D., et al., "Strategies for economical next-generation 50G and 100G passive optical networks [Invited]," Journal of Optical Communications and Networking, vol. 12, No. 1, Jan. 2020, pp. A95-A103.
Suls, A., et al., "Error Performance Prediction of Randomly Shortened and Punctured LDPC Codes," IEEE Communications Letters, vol. 23, No. 4, Apr. 2019, pp. 560-563.
Tian, T., et al., "Construction of Rate-Compatible LDPC Codes Utilizing Information Shortening and Parity Puncturing," EURASIP Journal on Wireless Communications and Networking, Jul. 2005, pp. 789-795.
EP Search Report mailed in corresponding EP 21 160 726.2 dated Dec. 15, 2022, 4 pages.

* cited by examiner

FORWARD ERROR CORRECTION

TECHNICAL FIELD

Various example embodiments relate generally to communication systems and, more particularly but not exclusively, to supporting forward error correction (FEC) in communication systems.

BACKGROUND

Forward error correction (FEC) may be used in various communication contexts in order to support improved communications over communication networks.

SUMMARY

In at least some example embodiments, an apparatus includes at least one processor and at least one memory including a set of instructions, wherein the set of instructions is configured to, when executed by the at least one processor, cause the apparatus to at least obtain channel characteristic information for a communication channel between a transmitter and a receiver in a communication network, select, based on the channel characteristic information, a forward error correction (FEC) setting for FEC to be applied to data communications on the communication channel, and provide, to at least one of the transmitter or the receiver, an indication of the FEC setting for the FEC to be applied to data communications on the communication channel. In at least some example embodiments, the channel characteristic information includes at least one of transfer function information, channel loss information, noise characteristic information, or error information. In at least some example embodiments, the channel characteristic information includes error modeling information based on modeling of probabilities of error events at the receiver. In at least some example embodiments, the error modeling information is based on an N-state Fritchman's Markov-chain model (FMM). In at least some example embodiments, the error modeling information includes information indicative of a received error-cluster distribution. In at least some example embodiments, the error modeling information includes information indicative of an error-free run distribution. In at least some example embodiments, the channel characteristic information is obtaining by determining the channel characteristic information at the apparatus based on a measurement performed on the communication channel. In at least some example embodiments, the channel characteristic information is obtained by receiving the channel characteristic information from a remote element. In at least some example embodiments, the FEC setting is selected by determining a FEC parameter for a current FEC code for the communication channel or determining a new FEC code for the communication channel. In at least some example embodiments, the FEC setting includes at least one of an amount of puncturing for a FEC code or an amount of shortening for a FEC code.

In at least some example embodiments, the FEC setting includes at least one of a base FEC matrix or a full FEC matrix. In at least some example embodiments, the FEC setting is selected based on evaluation of a set of FEC codes based on a target bit error rate (BER). In at least some example embodiments, to select the FEC setting, the set of instructions is configured to, when executed by the at least one processor, cause the apparatus to at least perform an evaluation of a set of low density parity check (LDPC) codes based on a target bit error rate (BER) and select one of the LDPC codes based on the evaluation of the set of LDPC codes based on the target BER. In at least some example embodiments, the FEC setting is selected based on at least one of a boundary condition, a transmitter capability of the transmitter, or a receiver capability of the receiver. In at least some example embodiments, the channel characteristic information includes error modeling information based on modeling of a probability of an error event at the receiver, wherein the FEC setting includes at least one of an amount of puncturing for a FEC code or an amount of shortening for a FEC code. In at least some example embodiments, the indication of the FEC setting includes at least one of the channel characteristic information, an indication of a FEC parameter for a FEC code, a FEC parameter for a FEC code, an indication of a FEC code, or a FEC code. In at least some example embodiments, the communication network includes an optical fiber network or a wireless network. In at least some example embodiments, the communication network includes a passive optical network (PON) and the communication channel is between an optical line terminal (OLT) and an optical network unit (ONU).

In at least some example embodiments, a non-transitory computer-readable medium stores a set of instructions which, when executed by at least one processor, cause an apparatus to at least obtain channel characteristic information for a communication channel between a transmitter and a receiver in a communication network, select, based on the channel characteristic information, a forward error correction (FEC) setting for FEC to be applied to data communications on the communication channel, and provide, to at least one of the transmitter or the receiver, an indication of the FEC setting for the FEC to be applied to data communications on the communication channel. In at least some example embodiments, the channel characteristic information includes at least one of transfer function information, channel loss information, noise characteristic information, or error information. In at least some example embodiments, the channel characteristic information includes error modeling information based on modeling of probabilities of error events at the receiver. In at least some example embodiments, the error modeling information is based on an N-state Fritchman's Markov-chain model (FMM). In at least some example embodiments, the error modeling information includes information indicative of a received error-cluster distribution. In at least some example embodiments, the error modeling information includes information indicative of an error-free run distribution. In at least some example embodiments, the channel characteristic information is obtaining by determining the channel characteristic information at the apparatus based on a measurement performed on the communication channel. In at least some example embodiments, the channel characteristic information is obtained by receiving the channel characteristic information from a remote element. In at least some example embodiments, the FEC setting is selected by determining a FEC parameter for a current FEC code for the communication channel or determining a new FEC code for the communication channel. In at least some example embodiments, the FEC setting includes at least one of an amount of puncturing for a FEC code or an amount of shortening for a FEC code. In at least some example embodiments, the FEC setting includes at least one of a base FEC matrix or a full FEC matrix. In at least some example embodiments, the FEC setting is selected based on evaluation of a set of FEC codes based on a target bit error rate (BER). In at least some example embodiments, to select the FEC setting, the set of instructions is configured to, when executed by the at least one processor, cause the apparatus to at least perform an evaluation of a set of low density parity check (LDPC) codes based on a target bit error rate (BER) and select one of the LDPC codes based on the evaluation of the set of LDPC codes based on the target BER. In at least some example embodiments, the FEC setting is selected based on at least one of a boundary condition, a transmitter capability of the transmitter, or a receiver capability of the receiver. In at least some example embodiments, the channel characteristic information includes error modeling information based on modeling of a probability of an error event at the receiver, wherein the FEC setting includes at least one of an amount of puncturing for a FEC code or an amount of shortening for a FEC code. In at least some example embodiments, the indication of the FEC setting includes at least one of the channel characteristic information, an indication of a FEC parameter for a FEC code, a FEC parameter for a FEC code, an indication of a FEC code, or a FEC code. In at least some example embodiments, the communication network includes an optical fiber network or a wireless network. In at least some example embodiments, the communication network includes a passive optical network (PON) and the communication channel is between an optical line terminal (OLT) and an optical network unit (ONU).

In at least some example embodiments, a method includes obtaining channel characteristic information for a communication channel between a transmitter and a receiver in a communication network, selecting, based on the channel characteristic information, a forward error correction (FEC) setting for FEC to be applied to data communications on the communication channel, and providing, to at least one of the transmitter or the receiver, an indication of the FEC setting for the FEC to be applied to data communications on the communication channel. In at least some example embodiments, the channel characteristic information includes at least one of transfer function information, channel loss information, noise characteristic information, or error information. In at least some example embodiments, the channel characteristic information includes error modeling information based on modeling of probabilities of error events at the receiver. In at least some example embodiments, the error modeling information is based on an N-state Fritchman's Markov-chain model (FMM). In at least some example embodiments, the error modeling information includes information indicative of a received error-cluster distribution. In at least some example embodiments, the error modeling information includes information indicative of an error-free run distribution. In at least some example embodiments, the channel characteristic information is obtaining by determining the channel characteristic information based on a measurement performed on the communication channel. In at least some example embodiments, the channel characteristic information is obtained by receiving the channel characteristic information from a remote element. In at least some example embodiments, the FEC setting is selected by determining a FEC parameter for a current FEC code for the communication channel or determining a new FEC code for the communication channel. In at least some example embodiments, the FEC setting includes at least one of an amount of puncturing for a FEC code or an amount of shortening for a FEC code. In at least some example embodiments, the FEC setting includes at least one of a base FEC matrix or a full FEC matrix. In at least some example embodiments, the FEC setting is selected based on evaluation of a set of FEC codes based on a target bit error rate (BER). In at least some example embodiments, selecting the FEC setting includes performing an evaluation of a set of low density parity check (LDPC) codes based on a target bit error rate (BER) and selecting one of the LDPC codes based on the evaluation of the set of LDPC codes based on the target BER. In at least some example embodiments, the FEC setting is selected based on at least one of a boundary condition, a transmitter capability of the transmitter, or a receiver capability of the receiver. In at least some example embodiments, the channel characteristic information includes error modeling information based on modeling of a probability of an error event at the receiver, wherein the FEC setting includes at least one of an amount of puncturing for a FEC code or an amount of shortening for a FEC code. In at least some example embodiments, the indication of the FEC setting includes at least one of the channel characteristic information, an indication of a FEC parameter for a FEC code, a FEC parameter for a FEC code, an indication of a FEC code, or a FEC code. In at least some example embodiments, the communication network includes an optical fiber network or a wireless network. In at least some example embodiments, the communication network includes a passive optical network (PON) and the communication channel is between an optical line terminal (OLT) and an optical network unit (ONU).

In at least some example embodiments, an apparatus includes means for obtaining channel characteristic information for a communication channel between a transmitter and a receiver in a communication network, means for selecting, based on the channel characteristic information, a forward error correction (FEC) setting for FEC to be applied to data communications on the communication channel, and means for providing, to at least one of the transmitter or the receiver, an indication of the FEC setting for the FEC to be applied to data communications on the communication channel. In at least some example embodiments, the channel characteristic information includes at least one of transfer function information, channel loss information, noise characteristic information, or error information. In at least some example embodiments, the channel characteristic information includes error modeling information based on modeling of probabilities of error events at the receiver. In at least some example embodiments, the error modeling information is based on an N-state Fritchman's Markov-chain model (FMM). In at least some example embodiments, the error modeling information includes information indicative of a received error-cluster distribution. In at least some example embodiments, the error modeling information includes information indicative of an error-free run distribution. In at least some example embodiments, the channel characteristic information is obtaining by determining the channel characteristic information based on a measurement performed on the communication channel. In at least some example embodiments, the channel characteristic information is obtained by receiving the channel characteristic information from a remote element. In at least some example embodiments, the FEC setting is selected by determining a FEC parameter for a current FEC code for the communication channel or determining a new FEC code for the communication channel. In at least some example embodiments, the FEC setting includes at least one of an amount of puncturing for a FEC code or an amount of shortening for a FEC code. In at least some example embodiments, the FEC setting includes at least one of a base FEC matrix or a full FEC matrix. In at least some example embodiments, the FEC setting is selected based on evaluation of a set of FEC codes based on a target bit error rate (BER). In at least some example embodiments, the means for selecting the FEC setting includes means for performing an evaluation of a set of low density parity check (LDPC) codes based on a target bit error rate (BER) and means for selecting one of the LDPC codes based on the evaluation of the set of LDPC codes based on the target BER. In at least some example embodiments, the FEC setting is selected based on at least one of a boundary condition, a transmitter capability of the transmitter, or a receiver capability of the receiver. In at least some example embodiments, the channel characteristic information includes error modeling information based on modeling of a probability of an error event at the receiver, wherein the FEC setting includes at least one of an amount of puncturing for a FEC code or an amount of shortening for a FEC code. In at least some example embodiments, the indication of the FEC setting includes at least one of the channel characteristic information, an indication of a FEC parameter for a FEC code, a FEC parameter for a FEC code, an indication of a FEC code, or a FEC code. In at least some example embodiments, the communication network includes an optical fiber network or a wireless network. In at least some example embodiments, the communication network includes a passive optical network (PON) and the communication channel is between an optical line terminal (OLT) and an optical network unit (ONU).

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
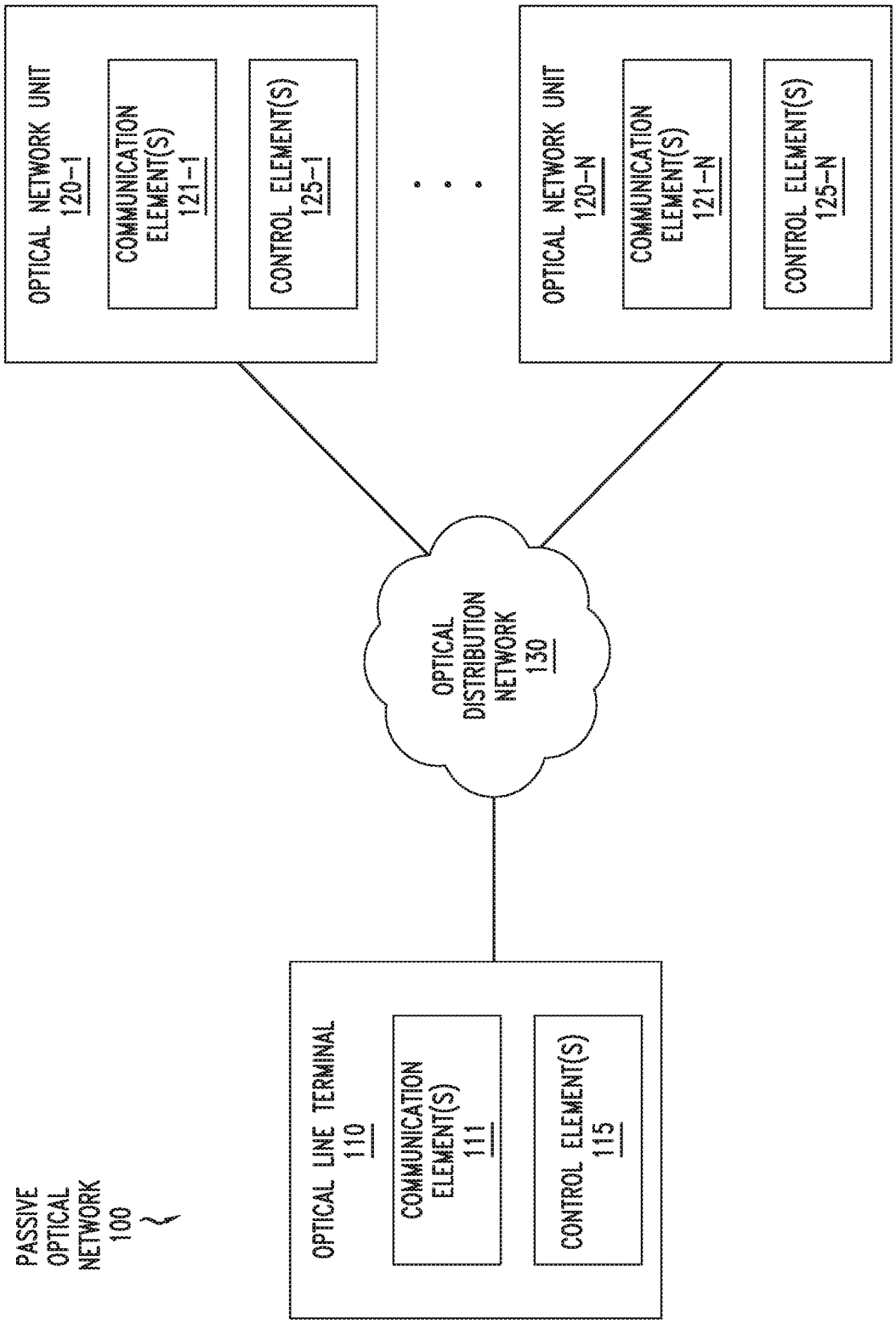
FIG. 1 depicts an example embodiment of a passive optical network (PON) configured to support forward error correction (FEC) on communication channels based on FEC settings selected for the communication channels based on channel conditions of the communication channels.

Various example embodiments for supporting forward error correction (FEC) in a communication system are presented. Various example embodiments for supporting FEC in a communication system may include selection of a FEC setting for a communication channel from a transmitter to a receiver based on channel characteristic information of the communication channel from the transmitter to the receiver. The selection of the FEC setting may include determining a setting for a current FEC code that is currently being used for communications on the communication channel (e.g., an amount of puncturing of the current FEC code, an amount of shortening of the current FEC code, or the like, as well as various combinations thereof), determining a new FEC code to be used for communications on the communication channel, or the like, as well as various combinations thereof. The channel characteristic information of the communication channel which may be used for selection of the FEC setting for the communication channel may include one or more of transfer function information, channel loss information, noise characteristic information, error information (e.g., bit error rate (BER), error modeling information (e.g., information indicative of a received error-cluster distribution, information indicative of error-free run distributions, or the like), or the like, as well as various combinations thereof), or the like, as well as various combinations thereof. Various example embodiments for supporting FEC in a communication system, based on selection of a FEC setting for a communication channel based on channel characteristic information of the communication channel, may be applied within various types of communication systems including various types of wired communication systems (e.g., fiber networks (e.g., Passive Optical Networks (PONs), point-to-point (P2P) fiber networks, or the like), Ethernet networks, Digital Subscriber Line (DSL) networks, cable networks (e.g., DOCSIS 3.1, DOCSIS 3.1 FDX, or the like), powerline communication networks (e.g., G.hn or the like), or the like, as well as various combinations thereof) or various types of wireless communication systems (e.g., cellular networks (e.g., Fourth Generation (4G), 4G Long Term Evolution (LTE), Fifth Generation (5G), or the like), WiFi networks, WiMAX networks, satellite networks, or the like, as well as various combinations thereof); however, for purposes of clarity, various example embodiments for supporting FEC in a communication system are primarily presented herein within the context of a PON and, more particularly, within the context of supporting FEC between an optical line terminal (OLT) and an optical network unit (ONU) via a communication channel in an optical distribution network (ODN) of the PON (e.g., downstream from OLT to ONU or upstream from ONU to OLT). Various example embodiments for supporting FEC between an OLT and an ONU in a PON may be configured to support ONU-specific FEC for the ONUs connected to an OLT, such that different FEC settings may be used by different ONUs connected to the same OLT. It will be appreciated that these and various other example embodiments and advantages or potential advantages of supporting selection of a FEC setting for a communication channel from a transmitter to a receiver based on channel characteristic information of the communication channel from the transmitter to the receiver may be further understood by way of reference to the various figures, which are discussed further below.

FIG. 1 depicts an example embodiment of a PON configured to support FEC on communication channels based on FEC settings selected for the communication channels based on channel conditions of the communication channels.

The PON 100 may be a system for providing network access to a set of customers. For example, the PON 100 may provide network access over "the last mile" (e.g., the final portion of a telecommunications network that delivers communications to and supports communications of the customers). For example, the PON 100 may operate as a point-to-multipoint (P2MP) data distribution system. It will be appreciated that the PON 100 may be one or more of various types of PONs, such as a time-division multiplexing PON (e.g., a gigabit-capable PON (GPON), an Ethernet PON (EPON), or the like), a wavelength-division multiplexing (WDM) PON, a time-and-wavelength-division (TWDM) PON (e.g., a Next-Generation Passive Optical Network (NG-PON), a Next-Generation Passive Optical Network 2 (NG-PON2), or the like), or the like, as well as various combinations thereof.

The PON 100 includes an optical line terminal (OLT) 110 and a set of optical network units (ONUs) 120-1-120-N (collectively, ONUs 120) connected via an optical distribution network (ODN) 130. The PON 100 may be configured to support downstream (DS) communications from the OLT 110 to the ONUs 120 via the ODN 130 and upstream (US) communications from the ONUs 120 to the OLT 110 via the ODN 130. It will be appreciated that the PON 100 may include various other elements which have been omitted for purposes of clarity.

The OLT 110 is configured to support communications between the ONUs 120 and one or more upstream networks (omitted for purposes of clarity). The OLT 110 may be located in a central location, such as a central office (CO) or other suitable location. For example, the one or more upstream networks may include one or more core communication networks configured to support communications of the OLT 110 and, thus, of the ONUs 120. For example, the OLT 110 may be configured to forward data received from the one or more upstream networks downstream toward the ONUs 120 via the ODN 130 and to forward data received from the ONUs 120 via the ODN 130 upstream toward the one or more upstream networks. The OLT 110 may include one or more communication elements 111 configured to support communications between the OLT 110 and the ONUs 120, including one or more transmission elements (e.g., an encoder, a transmitter, and the like) for DS communications to the ONUs 120 and one or more reception elements (e.g., a receiver, a decoder, and the like) for US communications from the ONUs 120. The OLT 110 may include one or more control elements 115 configured to control various aspects of communications between the OLT 110 and the ONUs 120, including one or more transmission controllers (e.g., an encoder controller or other controller), one or more reception controllers (e.g., a decoder controller or the like), and the like, as well as various combinations thereof. The OLT 110, including various components of the OLT 110 (e.g., communication elements 111, control elements 115, and the like) may be configured to support various functions for supporting FEC within the PON 100). It will be appreciated that the OLT 110 may include various other elements for supporting communications with the ONUs 120, for supporting FEC for communications between the OLT 110 and the ONUs 120, and the like, as well as various combinations thereof.

The ONUs 120 each are configured to support communications between the OLT 110 and one or more downstream networks or devices (omitted for purposes of clarity). The ONUs 120 may be located at respective user premises or other suitable locations. For example, the one or more downstream networks or devices for an ONU 120 may include one or more local area networks (LANs) of the customer, one or more communication devices of the customer (e.g., a modem, a router, a switch, a set top box, a smart television, a gaming system, a computer, a smartphone, or the like, as well as various combinations thereof). For example, an ONU 120 may be configured to forward data received from the OLT 110 via the ODN 130 downstream toward one or more downstream networks or devices and to forward data received from the one or more downstream networks or devices upstream toward the OLT 110 via the ODN 130. The ONUs 120 each may include one or more communication elements 121 (depicted as communication elements 121-1-121-N (collectively, communication elements 121) of ONUs 120-1-120-N, respectively) configured to support communications between the ONUs 120 and the OLT 110, including one or more transmission elements (e.g., an encoder, a transmitter, and the like) for US communications to the OLT 110 and one or more reception elements (e.g., a receiver, a decoder, and the like) for DS communications from the OLT 110. The ONUs 120 each may include one or more control elements 125 (depicted as control elements 125-1-125-N (collectively, control elements 125) of ONUs 120-1-120-N, respectively) configured to control various aspects of communications between the ONUs 120 and the OLT 110, including one or more transmission controllers (e.g., an encoder controller or other controller), one or more reception controllers (e.g., a decoder controller or the like), and the like, as well as various combinations thereof. The ONUs 120, including various components of the ONUs 120 (e.g., communication elements 121, control elements 125, and the like) may be configured to support various functions for supporting FEC within the PON 100). It will be appreciated that each of the ONUs 120 may include various other elements for supporting communications with the OLT 110, for supporting FEC for communications between the ONUs 120 and the OLT, and the like, as well as various combinations thereof.

The ODN 130 may be a data distribution system configured to support communications between the OLT 110 and the ONUs 120. The ODN 130 is depicted as being arranged in a branching configuration; however, it will be appreciated that various other P2MP configurations may be used. The ODN 130 may include various passive optical components (e.g., optical fibers, couplers, splitters, and the like) which do not require power to distribute data signals between the OLT 110 and the ONUs 120; however, it will be appreciated that the ODN 130 also may include active components (e.g., optical amplifiers and the like). It will be appreciated that the ODN 130 may include various other elements for supporting communications between the OLT 110 and the ONUs 120.

The PON 100 is configured to support forward error correction (FEC) for communications between the OLT 110 and the ONUs 120. The PON 100 may be configured to support selection of a FEC setting for a communication channel between the OLT 110 and an ONU 120 based on channel characteristic information of the communication channel between the OLT 110 and the ONU 120. The communication channel may be a DS channel from the OLT 110 to the ONU 120 or an US channel from the ONU 120 to the OLT 110.

The selection of the FEC setting for the communication channel between the OLT 110 and the ONU 120 may be performed for various types of FEC codes. For example, the selection of the FEC setting for the communication channel between the OLT 110 and the ONU 120 may be performed for low density parity check (LDPC) codes, Reed-Solomon codes, binary convolution codes, Hamming codes, or the like, as well as various combinations thereof. It will be appreciated that, although primarily present herein with respect to example embodiments in which the FEC code is an LDPC code, various example embodiments presented herein may use, or be adapted to use, various other types of FEC codes.

The selection of the FEC setting for the communication channel between the OLT 110 and the ONU 120, as indicated above, may be performed for an LDPC code. In general, an LDPC code is a block code that takes K information bits and encodes them into a codeword of N bits, which generally includes the K information bits in addition to N-K parity bits (meaning it is a systematic code). The code rate of an LDPC code is R=K/N, and its characteristics are fully described by an (N-K)×N parity check matrix H. The N columns of H correspond to the bits of the LDPC codeword, with the first K bits corresponding to information (data) bits $d_i$ and the last (N-K) bits corresponding to the parity bits $p_i$. The N-K rows correspond to the check constraints that any valid codeword of the LDPC code should satisfy: namely that the XOR-sum of all the bits indicated in the row has to be 0. This can be formally expressed as (a sum followed by a modulo-2 operation equivalent to an XOR-sum): mod(H.c,2)=0, where c is the column vector of the data bits d and the parity bits p. Contemporary LDPC codes are typically quasi-cyclic (QC) codes. The parity check matrix of such a code can be subdivided into Z×Z sub-matrices in which each sub-matrix is either a rotated identity matrix or an all zero matrix. Here, Z is often called the lifting factor. The parity check matrix of a QC code can be represented using a compact matrix $H_{compact}$ in which −1 indicates an all zero submatrix and any other element m indicates an identity submatrix that has been circularly right shifted by m. The advantage of QC LDPC codes is that they inherently allow parallelization, indicated by the fact that each of the Z check constraints in a row of $H_{compact}$ are the same constraint, but applied to a different set of (independent) bits. Again, it will be appreciated that, although primarily present herein with respect to example embodiments in which the FEC code is an LDPC code, various example embodiments presented herein may use, or be adapted to use, various other types of FEC codes.

The selection of the FEC setting for the communication channel between the OLT 110 and the ONU 120 may be performed in various ways. In at least some example embodiments, for example, the selection of the FEC setting for the communication channel between the OLT 110 and the ONU 120 may include determining a setting for a current FEC code currently being used for communications on the communication channel between the OLT 110 and the ONU 120 (e.g., an amount of puncturing of the current FEC code, an amount of shortening of the current FEC code, or the like, as well as various combinations thereof). It will be appreciated that the selection of the FEC setting for the communication channel between the OLT 110 and the ONU 120 may take into account the tradeoff between user bit-rate (FEC overhead) and link conditions where it will be appreciated that an increase in puncturing may result in an increase in throughput but a decrease in performance whereas an increase in shortening may result in a decrease in throughput but an increase in performance. In at least some example embodiments, for example, the selection of the FEC setting for the communication channel between the OLT 110 and the ONU 120 may include determining a new FEC code to be used for communications on the communication channel (e.g., a new FEC base code, a new FEC full matrix, or the like), or the like, as well as various combinations thereof. It will be appreciated that the determination of the FEC setting for the communication channel between the OLT 110 and the ONU 120 may depend on the type of FEC code being used or other factors.

The selection of the FEC setting for the communication channel between the OLT 110 and the ONU 120 based on the channel characteristic information of the communication channel between the OLT 110 and the ONU 120 may be based on various types of channel characteristic information which may be collected in various ways. For example, the channel characteristic information of the communication channel between the OLT 110 and the ONU 120 which may be used as a basis for selecting the FEC setting for the communication channel between the OLT 110 and the ONU 120 may include one or more of transfer function information, channel loss information, noise characteristic information, error information (e.g., bit error rate (BER), error modeling information (e.g., information indicative of a received error-cluster distribution (ECD), information indicative of error-free run distributions (EFRD), or the like), or the like, as well as various combinations thereof), or the like, as well as various combinations thereof. In at least some example embodiments, at least some of which are presented with respect to FIGS. 2-7, the channel characteristic information may include error modeling information based on modeling of probabilities of error events at the receiver (e.g., determined based on a multi-state Markov channel model, such as a 4-state Fritchman's Markov-chain model (FMM), which may be used for determining error distribution information such as information indicative of a received error-cluster distribution, information indicative of an error-free run distribution, or the like, as well as various combinations thereof). It will be appreciated that various other types of channel characteristic information of the communication channel between the OLT 110 and the ONU 120 may be used as a basis for selection of the FEC setting for the communication channel between the OLT 110 and the ONU 120.

The selection of the FEC setting for the communication channel between the OLT 110 and the ONU 120 also (e.g., in addition to channel characteristics) or alternatively (e.g., in place of channel characteristics) may be based on one or more of one or more boundary conditions, one or more communication element capabilities (e.g., a transmitter capability of the transmitter of the communication channel between the OLT 110 and the ONU 120, a receiver capability of the receiver of the communication channel between the OLT 110 and the ONU 120, or the like, as well as various combinations thereof), or the like, as well as various combinations thereof).

The selection of the FEC setting for the communication channel may be performed by OLT 110 (e.g., and the FEC setting that is selected, or at least an indication thereof, may be communicated by the OLT 110 to the ONU 120), by the ONU 120 (e.g., and the FEC setting that is selected, or at least an indication thereof, may be communicated by the ONU 120 to the OLT 110), by an entity on behalf of the OLT 110 and the ONU 120 (e.g., and the FEC setting that is selected, or at least an indication thereof, may be communicated to the OLT 110 and the ONU 120), or the like, as well as various combinations thereof.

The indication of the FEC setting selected for the communication channel may be provided to the OLT 110 and the ONU 120 in various ways. The indication of the FEC setting selected for the communication channel may be provided to the OLT 110 and the ONU 120 using various types of signaling or messaging (e.g., using in-band (IB) signaling or messaging, using out-of-band (OOB) signaling or messaging, using various message types, using various types of indicators or information, or the like, as well as various combinations thereof). The indication of the FEC setting, where the selection of the FEC setting for the communication channel is performed by OLT 110, may be considered to be provided to the OLT 110 by virtue of the fact that the OLT 110 has selected the FEC setting, may be considered to be provided to the OLT 110 via some internal messaging between components of the OLT 110, may be provided to the ONU 120 via IB or OOB messaging, or the like, as well as various combinations thereof. The indication of the FEC setting, where the selection of the FEC setting for the communication channel is performed by ONU 120, may be considered to be provided to the ONU 120 by virtue of the fact that the ONU 120 has selected the FEC setting, may be considered to be provided to the ONU 120 via some internal messaging between components of the ONU 120, may be provided to the OLT 110 via IB or OOB messaging, or the like, as well as various combinations thereof. The indication of the FEC setting, where the selection of the FEC setting for the communication channel is performed by an element other than the OLT 110 or the ONU 120, may be provided to the OLT 110 via messaging from the element to the OLT 110, may be provided to the ONU 120 via messaging from the element to the ONU 120, may be provided to the ONU 120 via messaging from the element to the OLT 110 that is then signaled from the OLT 110 to the ONU 120, may be provide to the OLT 110 via messaging from the element to the ONU 120 that is then signaled from the ONU 120 to the OLT 110, or the like, as well as various combinations thereof. The indication of the FEC setting may be communicated using various message types, such as Physical Layer Operation Administrations and Management (PLOAM) messages, ONU Management and Control Interface (OMCI) messages, or the like, as well as various combinations thereof.

It will be appreciated that various example embodiments discussed above related to the configuration of the PON 100 to support FEC for communications between the OLT 110 and the ONUs 120 may be further understood by further considering the DS direction of transmission within the PON 100 and the US direction of transmission within the PON 100, as discussed further below.

The PON 100 may be configured to support DS FEC for DS communications from the OLT 110 to the ONUs 120. It will be appreciated that, as discussed further below, support for DS FEC for DS communications from the OLT 110 to an ONU 120 may by controlled by the OLT 110 (or an element included within or in communication with the OLT 110), may be controlled by the ONU 120 (or an element included within or in communication with the ONU 120), may be controlled by one or more elements on behalf of the OLT 110 and the ONU 120, or the like, as well as various combinations thereof.

In one example, the OLT 110 may be configured to control support for DS FEC for DS communications from the OLT 110 to an ONU 120. In one example, the OLT 110 may obtain channel characteristic information for a channel from the OLT 110 to the ONU 120 (e.g., from the ONU 120 where the ONU 120 determines the channel characteristic information and provides the channel characteristic information to the OLT 110), select a FEC setting for the channel from the OLT 110 to the ONU 120 where the FEC setting is selected based on the channel characteristic information, and provide an indication of the FEC setting from the OLT 110 to the ONU 120 for use in supporting DS FEC for DS communications from the OLT 110 to the ONU 120.

In one example, an ONU 120 may be configured to control support for DS FEC for DS communications from the OLT 110 to the ONU 120. In one example, the ONU 120 may obtain channel characteristic information for a channel from the OLT 110 to the ONU 120 (e.g., locally at the ONU 120 where the ONU 120 determines the channel characteristic information based on DS communications from the OLT 110), select a FEC setting for the channel from the OLT 110 to the ONU 120 where the FEC setting is selected based on the channel characteristic information, and provide an indication of the FEC setting from the ONU 120 to the OLT 110 for use in supporting DS FEC for DS communications from the OLT 110 to the ONU 120.

In one example, a controller may be configured to control support for DS FEC for DS communications from the OLT 110 to the ONU 120. In one example, the controller may obtain channel characteristic information for a channel from the OLT 110 to the ONU 120 (e.g., from the ONU 120 where the ONU 120 determines the channel characteristic information and provides it to the controller, from the OLT 110 where the ONU 120 determines the channel characteristic information and provides it to the OLT 110 which in turn provides it to the controller, or the like), select a FEC setting for the channel from the OLT 110 to the ONU 120 where the FEC setting is selected based on the channel characteristic information, and provide an indication of the FEC setting from the controller to the OLT 110 and to the ONU 120 for use by the OLT 110 and the ONU 120 in supporting DS FEC for DS communications from the OLT 110 to the ONU 120.

It will be appreciated that the PON 100 may be configured in various other ways to support DS FEC for DS communications from the OLT 110 to the ONUs 120.

The PON 100 may be configured to support US FEC for US communications from the ONUs 120 to the OLT 110. It will be appreciated that, as discussed further below, support for US FEC for US communications from an ONU 120 to the OLT 110 may by controlled by the OLT 110 (or an element included within or in communication with the OLT 110), may be controlled by the ONU 120 (or an element included within or in communication with the ONU 120), may be controlled by one or more elements on behalf of the OLT 110 and the ONU 120, or the like, as well as various combinations thereof.

In one example, the OLT 110 may be configured to control support for US FEC for US communications from the ONUs 120 to the OLT 110. In one example, the OLT 110 may obtain channel characteristic information for a channel from the ONU 120 to the OLT 110 (e.g., locally at the OLT 110 where the OLT 110 determines the channel characteristic information based on US communications from the ONU 120), select a FEC setting for the channel from the ONU 120 to the OLT 110 where the FEC setting is selected based on the channel characteristic information, and provide an indication of the FEC setting from the OLT 110 to the ONU 120 for use in supporting US FEC for US communications from the ONUs 120 to the OLT 110.

In one example, an ONU 120 may be configured to control support for US FEC for US communications from the ONUs 120 to the OLT 110. In one example, the ONU 120 may obtain channel characteristic information for a channel from the ONU 120 to the OLT 110 (e.g., from the OLT 110 where the OLT 110 determines the channel characteristic information and provides the channel characteristic information to the ONU 120), select a FEC setting for the channel from the ONU 120 to the OLT 110 where the FEC setting is selected based on the channel characteristic information, and provide an indication of the FEC setting from the ONU 120 to the OLT 110 for use in supporting US FEC for US communications from the ONUs 120 to the OLT 110.

In one example, a controller may be configured to control support for US FEC for US communications from the ONUs 120 to the OLT 110. In one example, the controller may obtain channel characteristic information for a channel from the ONU 120 to the OLT 110 (e.g., from the OLT 110 where the OLT 110 determines the channel characteristic information and provides it to the controller, from the ONU 120 where the OLT 110 determines the channel characteristic information and provides it to the ONU 120 which in turn provides it to the controller, or the like), select a FEC setting for the channel from the ONU 120 to the OLT 110 where the FEC setting is selected based on the channel characteristic information, and provide an indication of the FEC setting from the controller to the OLT 110 and to the ONU 120 for use by the OLT 110 and the ONU 120 in supporting US FEC for US communications from the ONUs 120 to the OLT 110.

It will be appreciated that the PON 100 may be configured in various other ways to support US FEC for US communications from the ONUs 120 to the OLT 110.

The PON 100, by supporting selection of FEC settings for communication channels between the OLT 110 and the ONUs 120, may be configured to support use of different FEC settings by different ONUs 120 connected to the same OLT 110, such as ONU-specific FEC settings on an ONU-by-ONU basis for the ONUs 120 connected to the same OLT 110, group-specific FEC settings for groups of ONUs 120 connected to the same OLT 110 (e.g., two groups of ONUs 120, four groups of ONUs 120, or the like), or the like, as well as various combinations thereof. For example, in the case in which an ONU-specific setting is used for an ONU 120, the channel characteristic information of the communication channel between the OLT 110 and the ONU 120 may be used to determine the ONU-specific setting to be used for the ONU 120 (e.g., as discussed hereinabove for a single ONU 120 that is connected to the OLT 110). For example, in the case in which a group-specific FEC setting is used for a group of ONUs 120 connected to the OLT 110, the channel characteristic information of the communication channels between the OLT 110 and the ONUs 120 may be used to identify the assignment of the ONUs 120 to the different groups of ONUs 120 and may then be used within the groups of ONUs 120 to determine the FEC settings for the different groups of ONUs 120 (which are to be applied to the ONUs 120 of the groups of ONUs 120), respectively. For example, in a P2MP network, channel characteristic information may be used for dividing the receivers into groups and for applying FEC settings to the receivers in the receiver groups, respectively.

It will be appreciated that the various functions discussed as being performed by specific elements of PON 100 may be performed by various other elements of PON 100. For example, various functions described as being performed by the OLT 110 may be performed by one or more of the components of the OLT 110 (e.g., a decoder, a decoder controller, an encoder, an encoder controller, an OLT controller, or the like, as well as various combinations thereof), one or more elements in communication with the OLT 110, or the like, as well as various combinations thereof. Similarly, for example, various functions described as being performed by the ONU 120 may be performed by one or more of the components of the ONU 120 (e.g., a decoder, a decoder controller, an encoder, an encoder controller, an ONU controller, or the like, as well as various combinations thereof), one or more elements in communication with the ONU 120, or the like, as well as various combinations thereof. It will be appreciated that such functions may be combined in various ways, distributed in various ways, or the like, as well as various combinations thereof.

It will be appreciated that, although various example embodiments presented herein are primarily described relative to the OLT and ONU perspectives, various example embodiments presented herein also may be described relative to transmitter and receiver perspectives (e.g., various example embodiments presented herein for supporting DS FEC from the OLT to the ONU may be considered to be embodiments for supporting DS FEC from a transmitter to a receiver where control of the DS FEC may be provided on the transmitter side or the receiver side, various example embodiments presented herein for supporting US FEC from the ONU to the OLT may be considered to be embodiments for supporting US FEC from a transmitter to a receiver where control of the US FEC may be provided on the transmitter side or the receiver side, and so forth), encoder and decoder perspectives (e.g., various example embodiments presented herein for supporting DS FEC from the OLT to the ONU may be considered to be embodiments for supporting DS FEC from an encoder to a decoder where control of the DS FEC may be provided on the encoder side or the decoder side, various example embodiments presented herein for supporting US FEC from the ONU to the OLT may be considered to be embodiments for supporting US FEC from an encoder to a decoder where control of the US FEC may be provided on the encoder side or the decoder side, and so forth), or the like, as well as various combinations thereof. It will be appreciated that various example embodiments presented herein may be further understood by way of reference to example embodiments for supporting selection of FEC settings for a communication channel from a transmitter to a receiver and communication of the FEC setting for the communication channel to the transmitter and the receiver for use by the transmitter and the receiver in applying FEC for communications on the communication channel, at least some of which are presented herein with respect to FIG. 8.

It will be appreciated that such example embodiments may be further understood by considering various aspects of such example embodiments as discussed further herein.

It will be appreciated, as indicated above, that various example embodiments for supporting collection of various types of channel characteristic information of a communication channel, for use in selection of the FEC setting for FEC on the communication channel, may be supported.

In at least some example embodiments, as presented with respect to FIGS. 2-7, the channel characteristic information of a communication channel that is using LDPC for FEC may be collected based on modeling the probability of error events such as consecutive errors (which also may be referred to as error clusters) at the receiver to support evaluation of the performance of an LDPC code down to a target bit-error rate (BER) at the receiver.

Hard-decision input LDPC codes have been adopted for FEC in several communication systems, such as the IEEE 802.3ca 25 Gb/s PON and others. The binary symmetric channel (BSC) model is predominantly used for FEC performance evaluation with hard decision inputs. Nevertheless, in order to assess FEC performance in more realistic conditions with correlated errors, the 802.3ca LDPC code was also evaluated in a burst error channel modeled using the 2-state Gilbert-Elliot (GE) Markov chain that emulated the error behavior at the decision feedback equalizer (DFE) output prior to FEC decoding.

The ITU-T is developing a 50 Gb/s per wavelength PON standard using binary non-return to zero (NRZ) signaling, where the wavelength of 1342±2 nm and a reach of 20 km have been agreed upon for downstream transmission. This corresponds to a worst-case chromatic dispersion (CD) of 74 ps/nm. In order to keep costs relatively low, components from datacenter ecosystem, such as lower-bandwidth 25 Gb/s class components, may be leveraged. At the same time, 50G PON is expected to minimally offer a range of optical budgets similar to that of previous, lower-rate systems. Consequently, it is expected that, at such high symbol rates, complex receiver equalization schemes (e.g., maximum likelihood sequence estimation (MLSE) or continuous-time linear equalizer (CTLE) with DFE) may be used to combat the inter-symbol interference (ISI) introduced by limited bandwidth components as well as reduced tolerance to CD.

In at least some example embodiments, channel conditions for a communication channel may be measured based on characterization of error correlation based on relative probabilities of consecutive error events referred to as error clusters. In at least some example embodiments, a sub-class of Fritchman's Markov-chain models (FMMs) may be used as a generative model that fits the measured error-cluster probabilities and errors generated by the FMMs then may be used to evaluate the performance of an LDPC code down to a target bit-error rate (BER). It will be appreciated that such embodiments may be further understood when considered and evaluated within the context of a 50 Gb/s PON system as discussed further below. As discussed further below, 50 Gb/s PON transmission experiments with advanced equalization schemes were performed and the error correlation at the equalizer output was characterized using the relative probabilities of the error clusters. A sub-class of FMMs was used as a generative model that fits the measured error-cluster probabilities and the errors generated by the FMMs then were used to evaluate the performance of an LDPC code down to a target BER of 1E-12.

Here, consider an LDPC code, similar to that of the LDPC code described in the IEEE P802.3ca/D2.2 Draft Standard for Ethernet Amendment—Physical Layer Specifications and Management Parameters for 25 Gb/s and 50 Gb/s Passive Optical Networks, for a 50G PON and a focus on accurate modeling of the ECD at the input to the LDPC decoder (i.e., after equalization). It is noted that, while more complex modeling using both ECD and EFRD simultaneously is possible, it is omitted here for purposes of clarity. Consequently, an N-state FMM having a single good (error-free) state G, and N−1 bad (error) states, $B_i$, $i \in 1, \ldots, N-1$ is considered. Further, the N-state FMM is constrained such that: (a) the good state is only allowed to transition to the first bad state B1 or to itself, (b) each of the N−2 bad states $B_i$, $i \in 1, \ldots, N-2$ can transition to G, to itself, or to the next bad state $B_{i+1}$, and (c) the last bad state $B_{N-1}$ can transition only to itself or to G. A transition to a bad state results in a bit error (binary '1'), while a transition into the good state indicates the absence of an error (binary '0'). Such an N-state FMM can be shown to accurately model the ECD up to length N−1 and the asymptotic slope as the cluster length tends to infinity. Here, for purposes of clarity, N is limited to 4; however, it will be appreciated that the N-state FMM may be configured for other values of N. The 4-state FMM is depicted in FIG. 2.

Figure 2:
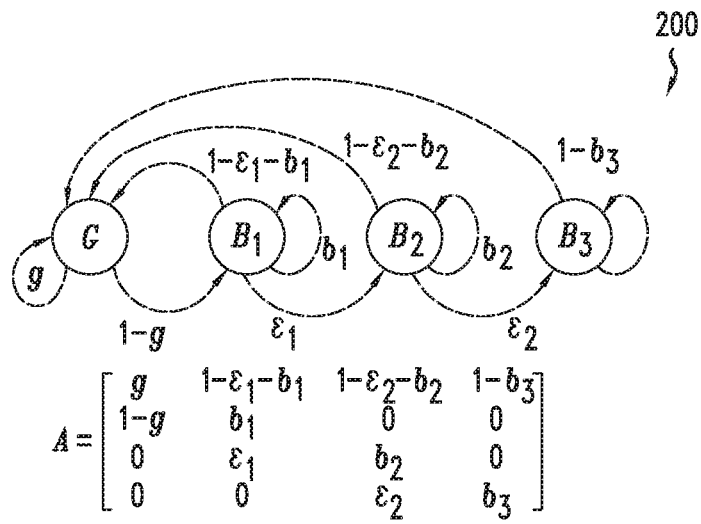
FIG. 2 depicts an example embodiment of a 4-state Fritchman's Markov-chain model (FMM) configured to support evaluation of channel conditions of a communication channel for use in selecting a FEC setting for the communication channel.

FIG. 2 depicts an example embodiment of a 4-state FMM configured to support evaluation of channel conditions of a communication channel for use in selecting a FEC setting for the communication channel.

The 4-state FMM of FIG. 2 is based on use of ECD as the error distribution information; however, it will be appreciated that the 4-state FMM (or other suitable N-state FMMs) may be developed for other types of error distribution information (e.g., EFRD, a combination of ECD and EFRD, or the like).

The 4-state FMM of FIG. 2 is based on use of a particular algorithm for determining the coefficients of the 4-state FMM (discussed further below); however, it will be appreciated that various other algorithms may be used for determining the coefficients of the 4-state FMM (or other suitable N-state FMMs). It will be further appreciated that the general procedure for the particular algorithm for determining the coefficients of the 4-state FMM as discussed further below, as well as the general procedure for other algorithms which may be used for determining the coefficients of the 4-state FMM (or other suitable N-state FMMs), may be extended for use in developing various types of N-state FMMs which may be configured to support automated fitting of various types of error data which may be collected and used for selection of FEC settings for communication channels.

The 4-state FMM of FIG. 2 is based on use of a particular algorithm for determining the coefficients of the 4-state FMM based on ECD data. For this algorithm, it can be shown that the probability of an error-cluster of length n (i.e., a sequence of exactly n 'ones' book-ended by 'zeros'), denoted as $p_n$, is given by Equation 1 (Eq. 1) as follows:
$p_1 = (1-g)(1-\varepsilon_1-b_1)$; $p_2 = (1-g)[b_1(1-\varepsilon_1-b_1)+\varepsilon_1(1-\varepsilon_2-b_2)]$; $p_n = b_1 p_{n-1} + (1-g) b_2^{n-2} \varepsilon_1 (1-\varepsilon_2-b_2) + (1-g) \varepsilon_1 \varepsilon_2 (1-b_3) \Sigma_{i=0}^{n-3} b_2^i b_3^{n-3-i}$, $n \geq 3$. The parameters $b_i$ and $\varepsilon_i$ model the relative cluster length probabilities with respect to $p_1$ and may be determined by curve fitting techniques. The parameter g serves as a normalizing factor to ensure that the desired average BER, $P_e$, is met. Given $P_e$, $b_i$, $\varepsilon_i$, i=1,2,3, the value of g is determined by Equation 2 (Eq. 2) as follows:
$g = 1 - ((1-b_1)(1-b_2)(1-b_3)P_e / ((1-P_e)(1-b_2-b_3+b_2 b_3+\varepsilon_1-b_3\varepsilon_1+\varepsilon_1\varepsilon_2)))$. The algorithm may be performed as follows. First, assume that ECD data for clusters of length up to N is available in a vector $v = [v_1, v_2, \ldots, v_N]$. Set $\varepsilon_1 = (\Sigma_{n=2}^N v_n)/(\Sigma_{n=1}^N v_n)$ and set $b_1 = 0$. Set $\varepsilon_2 = (\Sigma_{n=3}^N v_n)/(\Sigma_{n=2}^N v_n)$ and set $b_2 = 0$. Set b3=mean $((v_{n+1})/n))$, n=3, ..., N'≥N, where the ratios are averaged for n=3 to N' and N' is an arbitrarily determined integer up to which the collected ECD is assumed to be statistically reliable. This step effectively implies that the value of $b_3$ is chosen to provide a constant slope determined by the average slope of the measured data for clusters of length three or more. Then, based on the desired average BER, $P_e$, g is determined as illustrated above in Eq. 2. It will be appreciated that, generally speaking, while the fit to data for relatively short runs of errors is expected to be good, the fit to data for longer runs of errors may not be as good and may reach a point where it may be better to define the behavior based on a constant relative slope of consecutive errors to probability. It will be further appreciated that, in at least some situations, N' may be used as a knob to get the best fit.

It will be appreciated that the 4-state FMM depicted in FIG. 2 is merely one example of an N-state FMM which may be used for fitting the measured error information (e.g., other numbers of states may be used, other types of models may be used, or the like, as well as various combinations thereof).

Figure 3:
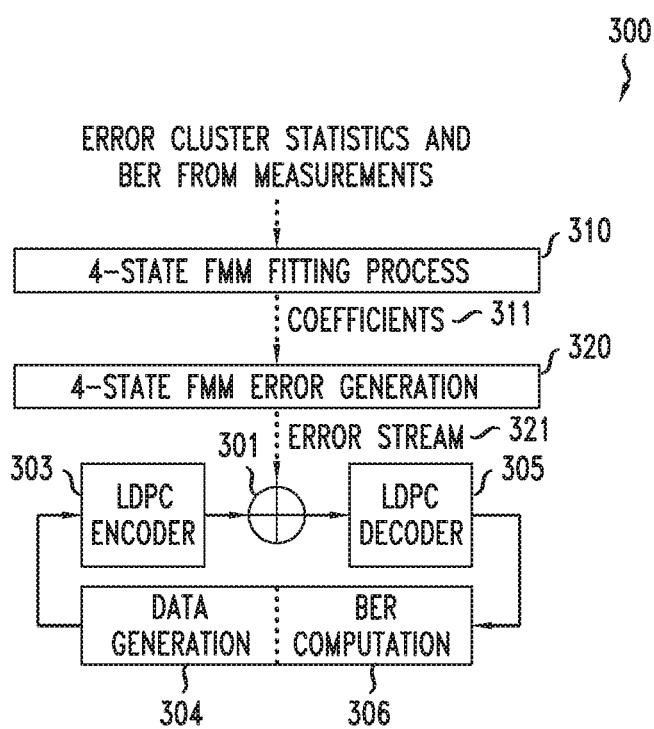
FIG. 3 depicts an example embodiment of an error modeling and simulation process based on the 4-state FMM of FIG. 2.

FIG. 3 depicts an example embodiment of an error modeling and simulation process based on the 4-state FMM of FIG. 2.

As depicted in FIG. 3, the 4-state FMM error modeling and simulation process 300 is provided within the context of a communication channel 301 between an LDPC encoder 303 and an LDPC decoder 305. Data generation 302 is used to generate data that is sent over the communication channel 301 between the LDPC encoder 303 and the LDPC decoder 305 and BER computation 306 is used to obtain the BER for the communication channel 301 between the LDPC encoder 303 and the LDPC decoder 305 The 4-state FMM error modeling and simulation process 300 is configured to produce an error stream 321 that is applied to the communication channel 301 between the LDPC encoder 303 and an LDPC decoder 305. Error statistics and BER from measurements are input to a 4-state FMM fitting process 310 which produces a set of coefficients 311 based on the error statistics and BER from measurements. The error statistics may include ECDs, EFRDs, or the like, as well as various combinations thereof. The coefficients 311 produced by the 4-state FMM fitting process 310 are fitted coefficients. The coefficients 311 produced by the 4-state FMM fitting process 310 are input to a 4-state FMM error generation process 320 which produces the error stream 321. The error stream 321 are correlated errors which may be used to evaluate FEC settings (e.g., FEC codes, FEC code settings, or the like) to determine performance for use in FEC setting selection. The error stream 321 produced by the 4-state FMM error generation process 320 is applied to the communication channel 301 between the LDPC encoder 303 and the LDPC decoder 305. Data generation 302 is used to generate data which is sent over the communication channel 301 to which the error stream 321 is applied. BER computations 306 are performed (e.g., by the LDPC decoder 305 or other suitable element) in order to obtain the BER for the communication channel 301 to which the error stream 321 is applied. It will be appreciated that the 4-state FMM error modeling and simulation process 300 allows for rapid testing of FEC codes in more meaningful channel conditions to make meaningful and holistic performance comparisons of various combinations of equalization schemes and FEC. It will be appreciated that the 4-state FMM error modeling and simulation process 300 may support FEC code selection in a multi-FEC driven flexible-rate PON scheme to achieve tradeoffs between information throughput and reach.

It will be appreciated that, although primarily presented with respect to use of 4 states in the model, any suitable number of states may be used in the model (e.g., an N-state model may be used to emulate correlated errors at the output of receiver equalization schemes).

It will be appreciated that an N-state model (including the 4-state model as presented in FIG. 2) may be provided in various ways, such as by implementation using a field programmable gate array (FPGA) using a pipelined architecture, using an application specific integrated circuit (ASIC), a simulation model, or the like, as well as various combinations thereof.

It will be appreciated that the error statistics used to determine FEC code settings may be collected in various ways. The manner in which the error statistics are collected may depend on the direction of transmission (e.g., DS versus US), due to differences associated with the different directions of transmission, such that different FEC codes may be optimal for the different directions of transmission. For example, in an optical fiber network, such difference may include operation of the DS and the US using different wavelengths which suffer from different chromatic dispersion, operation of the US in burst mode, or the like. For example, for DS communications, if the FEC setting selection is performed by the OLT, error statistics of the DS that are collected by the ONU may be provided from the ONU to the OLT (e.g., on the US wavelength on a predefined back-channel or using any other suitable channel), such that the OLT may make ONU-by-ONU ONU-specific determinations of the optimal FEC settings for the ONUs connected to the OLT. For example, for DS communications, where a dedicated US back-channel is not available or not desirable for reporting error statistics from the ONU to the OLT, the error statistics may be sent to a centralized entity (e.g., uploaded to a device, system, cloud, or the like) such that the centralized entity may perform the FEC setting selection or such that the OLT may access the error statistics from the centralized entity to perform the FEC setting selection. For example, for US communications, if the FEC setting selection is performed by the OLT, the OLT (e.g., the OLT receiver or an associated element) may collect the error statistics and use the error statistics to make ONU-by-ONU ONU-specific determinations of the optimal FEC settings for the ONUs connected to the OLT. It will be appreciated that the error statistics may be collected and used in various other ways.

It will be appreciated that FEC code settings determined based on the error statistics may be instantiated for use on the communication channel in various ways. The manner in which the FEC code settings are instantiated may depend on the direction of transmission (e.g., DS versus US), e.g., depending on where error statistics collection is performed and where the resulting error statistics are maintained as discussed above. It also will be appreciated that FEC code setting changes may be performed independently across ONUs as well as independently for the DS and US directions for each ONU. It will be appreciated that FEC settings that are selected may be communicated to the OLT and/or to the ONU in various ways, which may depend on the direction of transmission. For example, for DS communications, there may be an OLT-initiated mechanism to indicate to each ONU the selected FEC setting and the timing for when the ONU is to engage the decoder for that FEC setting (e.g., the switch to the selected FEC setting may happen at a frame indicated from the OLT to the ONU when providing the selected FEC setting, the switch to the selected FEC setting may happen at a predefined superframe after the OLT sends the message with the selected FEC setting, or the like). For example, for US communications, there may be an OLT-initiated mechanism to indicate to each ONU the selected FEC setting and the timing for when the ONU is to engage the encoder for that FEC setting (e.g., the switch to the selected FEC setting may happen at a frame indicated from the OLT to the ONU when providing the selected FEC setting, the switch to the selected FEC setting may happen at a predefined superframe after the OLT sends the message with the selected FEC setting, or the like). It will be appreciated that FEC code settings determined based on the error statistics may be instantiated for use on the communication channel in various other ways.

It will be appreciated that various combinations of such embodiments may be used to support a flex-rate PON in which different FEC settings may be used for different ONUs and even for different directions of transmission for each ONU. Here, assume that each, for each OLT-ONU link, the entity controlling selection of FEC settings may choose between L FEC codes independently for the DS and US directions. In at least some example embodiments, the system may operate as follows. The PON system is started such that a FEC code is used for each ONU connected to the OLT. The same initial FEC code may be used for each ONU (e.g., a FEC code for that is expected to have the best BER performance for all of the ONUs connected to the OLT, although some ONUs may be overprotected) or the initial FEC codes for the ONUs may be ONU-specific FEC codes selected for the ONUs (e.g., based on an initial determination of the best FEC code for the each ONU, such that different initial FEC codes may be selected for each ONU). Then, for each ONU that is connected to the OLT (or at least for each ONU for which FEC selection is to be performed, which may be a subset of the ONUs connected to the OLT), collect error data (e.g., BER data, ECD/EFRD data, or the like, as well as various combinations thereof) at the input to the FEC code at the receiver of the ONU, determine the N-state Markov model and its parameters that fit to the error data for that ONU (it will be appreciated that this may be done separately for the DS and US directions), and use the N-state Markov model to evaluate the L FEC choices to select the optimal FEC code for that ONU (and for that direction of transmission where different N-state Markov models are determined for the DS and US directions). It will be appreciated that the optimality of the FEC code may be evaluated in various ways (e.g., maximum throughput while still meeting the target BER performance or using any other suitable evaluation criteria). If the optimal FEC code that is selected is the FEC code that is currently being used, then the OLT and ONU may continue operating based on that FEC code. If the optimal FEC code that is selected is different than the FEC code that is currently being used, than a switch to the optimal FEC code may be initiated. It will be appreciated that, although this process is primarily described with respect to example embodiments in which the FEC setting is the FEC code, it will be appreciated that this process also may be used for evaluating and using other types of FEC settings which may include changes to existing FEC codes (e.g., changing the amount of puncturing, changing the amount of shortening, or the like, as well as various combinations thereof).

It will be appreciated that, in this manner, use of such an N-state model enables evaluation of FEC settings based on statistical modeling of correlated errors received at each receiver such that per-endpoint FEC setting selection may be supported (e.g., per ONU in a PON, per user equipment (UE) in a cellular network, and so forth).

Figure 4:
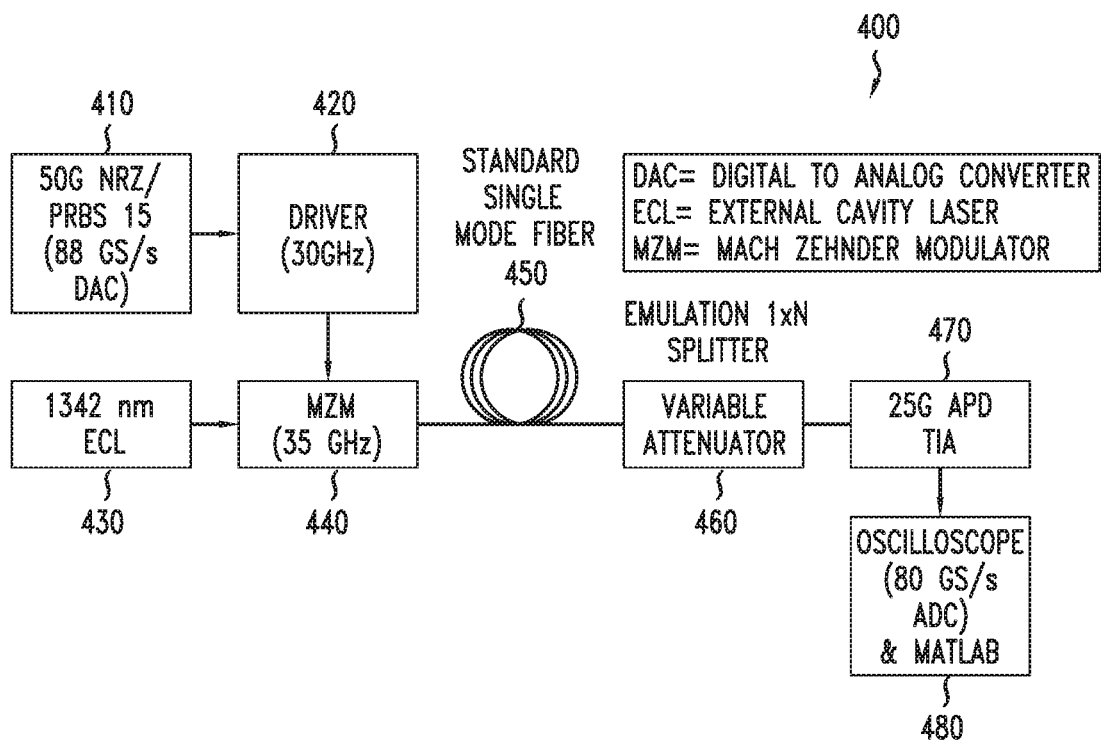
FIG. 4 depicts an example system for optical transmission measurements with 50 Gb/s NRZ signaling at 1342 nm using a 25 Gb/s class avalanche photo diode (APD) trans-impedance amplifier (TIA) receiver.
Figure 5:
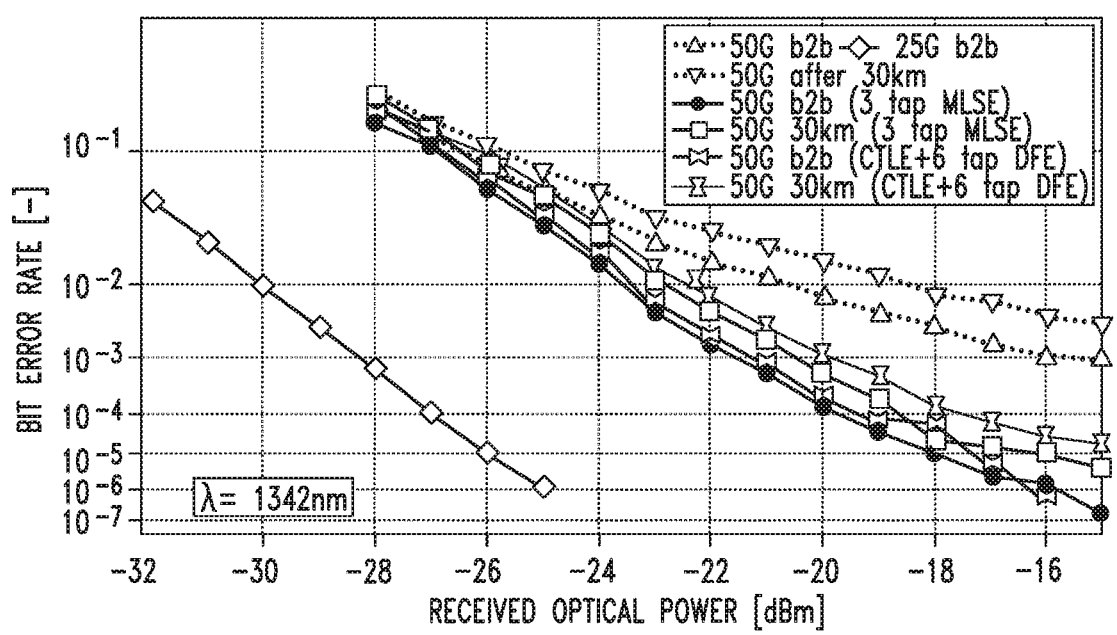
FIG. 5 depicts bit error rate (BER) versus received optical power (ROP) for the example system of FIG. 4.

FIG. 4 depicts an example system for optical transmission measurements with 50 Gb/s NRZ signaling at 1342 nm using a 25 Gb/s class avalanche photo diode (APD) transimpedance amplifier (TIA) receiver. The system 400 includes a 50 Gb/s NRZ/PRBS15 generator 410, a 30 Ghz driver 420, a 1342 nm external cavity laser (ECL) 430, a Mach-Zehnder modulator (MZM) 440, a standard single mode fiber 450, a variable attenuator 460, a 25G APD TIA receiver 470, and an oscilloscope 480. Using the example system 400, measurements are performed for both back-to-back (b2b) transmission and transmission over 30 km over standard single-mode fiber (SSMF) corresponding to 83 ps/nm of dispersion, which is expected to cover the worst case for PON systems. The received signal is equalized using either (a) a 3-tap MLSE or (b) a CTLE with 6-tap DFE (CTLE+DFE). FIG. 5 depicts BER versus ROP for the example system of FIG. 4. In FIG. 5, it may be seen that, for the typical LDPC hard decision BER threshold of 1E-2, the MLSE provides a gain of ~3 dB in the b2b case and ~4.4 dB for 30 km SSMF. A significant portion of the equalization is devoted to overcoming the bandwidth limitation; however, the impact of CD is not negligible and leads to a 0.7 dB residual penalty after MLSE equalization. The CTLE+DFE performs slightly worse and provides a gain of ~2.8 dB for b2b and ~4.1 dB for 30 km SSMF, and the residual CD penalty is ~0.8 dB.

Figure 6:
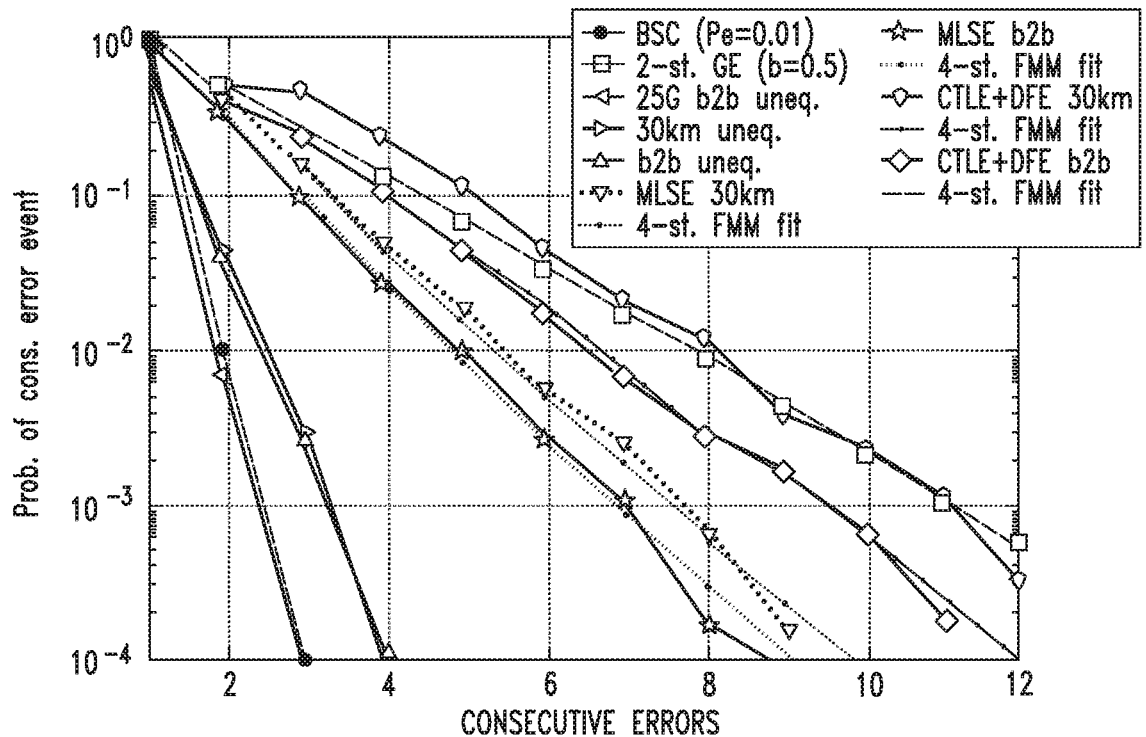
FIG. 6 depicts ECD normalized to 1-error event probability as a function of error cluster length.

FIG. 6 depicts the ECD normalized to the 1-error event probability as a function of the cluster length. Solid lines with filled markers indicate measurement data for points in FIG. 5 near or above the 1E-2 BER threshold for cases with and without equalization. All plotted measurement data corresponds to 50 Gb/s experiments unless noted otherwise. When 25 Gb/s experiments are carried out with the same APD-TIA, the ECD of the b2b non-equalized received signal is very close to that of the BSC corresponding to the average BER, thereby indicating minimal correlation (ISI). On the other hand, with 50 Gb/s transmission, the ECD without equalization already deviates from that of the BSC (30 km uneq' and 'b2b uneq' curves). After MLSE equalization, the probability of longer error clusters increases significantly. This effect is even more pronounced with CTLE+DFE where, for example, after equalizing for 30 km transmission, the probability of 3-clusters roughly equals that of 2-clusters and probabilities of longer clusters decrease at a constant relative ratio of ~0.46. As depicted in FIG. 3, these ECDs may be fit with the 4-state FMM and the resulting FMM may be used as a generative model to inject errors prior to LDPC decoding. In FIG. 6, dotted lines with like markings show the ECD of corresponding fits using the 4-state FMM obtained using Eq. (1). The fit parameters may be determined manually or computed using curve fitting techniques. It may be seen that the 4-state FMM is capable of accurately capturing the relative behavior of error clusters of length 1 to 3, and then the asymptotic slope as the cluster length increases. Simulated ECDs for the BSC as well as the 2-state GE model with b=0.5 are provided as dashed lines for reference.

Figure 7:
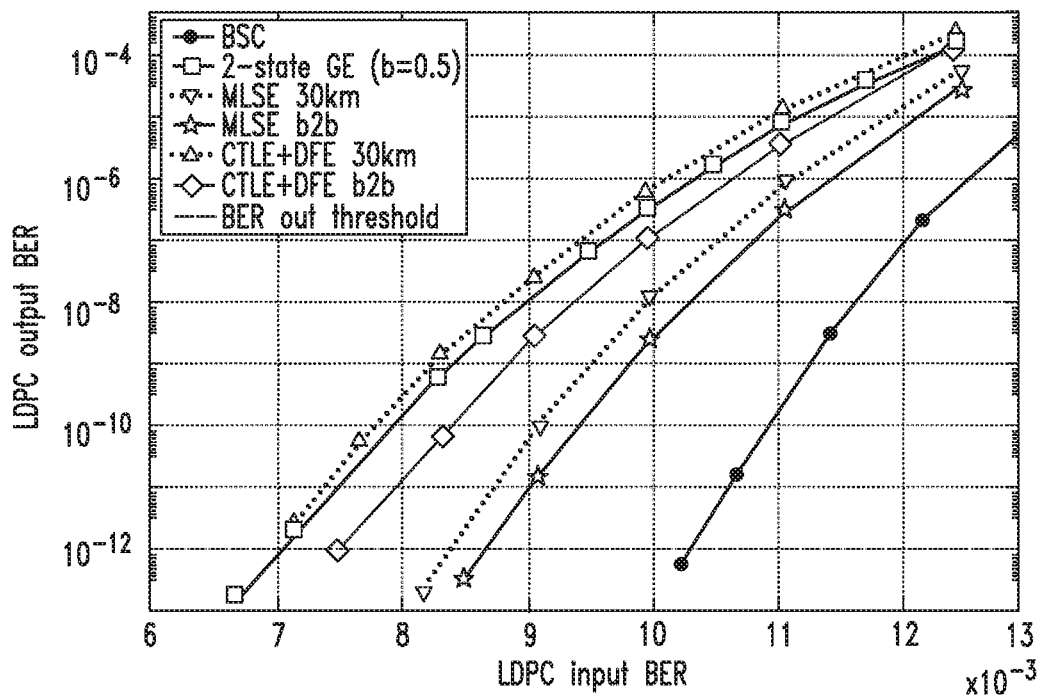
FIG. 7 depicts LDPC decoder output BER versus input BER for a variant of the IEEE 802.3ca quasi-cyclic LDPC code with a code rate of approximately 0.85.

FIG. 7 depicts LDPC decoder output BER versus input BER for a variant of the IEEE 802.3ca quasi-cyclic LDPC code with a code rate of approximately 0.85. Each simulation point is based on 500 or more bit errors. In general, the ECD for a given equalization scheme varies as a function of the BER; however, these variations are observed to be minimal in the narrow window of BERs over which the LDPC code is evaluated; hence, a fixed set of FMM parameters (other than g) is used to generate each curve. With the BSC channel, the target output BER of 1E-12 is achieved at an input BER of 1.03E-2; on the other hand, with the GE b=0.5 channel, the input BER is 6.9E-3. For the 4-state fit to the 30 km MLSE measurements, the input BER is 8.3E-3. Referring to FIG. 5, this reduction in input BER with respect to the BSC to achieve an output BER of 1E-12 translates to an optical power penalty (OPP) of 0.3 dB due to correlated errors at the output of the MLSE. Even in the b2b MLSE case, the required input BER is 8.6E-3, which translates to an OPP of ~0.15 dB. Similarly, with CTLE+DFE, the expected input BERs required to meet the target are 6.8E-3 and 7.4E-3 for 30 km and b2b, which translate to OPPs of ~0.6 dB and ~0.3 dB, respectively.

It will be appreciated, at least from FIGS. 2-7, that consecutive error behavior at the output of different equalization schemes for 50G PON transmission systems with transceiver bandwidth limitation and dispersion may be accurately represented using Markov models with more than two states. As indicated hereinabove, evaluation of a variant of the IEEE 802.3ca LDPC code using this model to generate errors shows optical power penalties of 0.3 dB and 0.6 dB for equalizing a 30 km transmission using MLSE and CTLE+DFE, respectively. This penalty may be included in the PON link budget calculation when comparing equalization schemes that introduce correlated errors at the LDPC decoder input. It will be appreciated that, although primarily described with respect to various configurations and assumptions, error behavior modeling using Markov models with more than two states may be used to represent error behavior for 50G PON transmission system under various other conditions (e.g., using other configurations, based on other assumptions, or the like, as well as various combinations thereof).

In at least some example embodiments, an apparatus includes an OLT for transmitting and receiving data from a plurality of ONUs via an optical fiber network, wherein the OLT is configured to forward error correct data for transmission to ONUs such that FEC codes for the data transmitted to some of the ONUs have different amounts of, at least, one of puncturing and shortening than others of the ONUs, and wherein the OLT is configured to determine the amounts of the, at least, one of puncturing and shortening based on error statistics information received from ones of the ONUs. In at least some example embodiments, the information is indicative of received error-cluster distributions at individual ones of the ONUs. In at least some example embodiments, the information is indicative of error-free run distributions of the data received at individual ones of the ONUs. In at least some example embodiments, the information is further indicative of received error-cluster distributions of the data received at the individual ones of the ONUs. In at least some example embodiments, the OLT is configured to transmit to, at least, one of the ONUs, information indicative of a selected FEC code for the data for transmission to the, at least, one of the ONUs (e.g., wherein the information received from ones of the ONUs is indicative of received error-cluster distributions at individual ones of the ONUs, wherein the information received from ones of the ONUs is indicative of error-free run distributions of the data received at individual ones of the ONUs, wherein the other information received from ones of the ONUs is indicative of error-free run distributions of the data received at the individual ones of the ONUs, or the like). In at least some example embodiments, the apparatus further includes the optical fiber network. In at least some example embodiments, the apparatus further includes the ONUs, wherein the ONUs are configured to transmit, to the OLT, information indicative of, at least, one of received error-cluster distributions of the data received at the ONUs and error-free run distributions of the data received at individual ones of the ONUs. In at least some example embodiments, the ONUs are configured to transmit, to the OLT, information indicative of both of received error-cluster distributions of the data received at the ONUs and error-free run distributions of the data received at the individual ones of the ONUs. In at least some example embodiments, the OLT is configured to transmit, to one of the ONUs, information indicative of a selected FEC code for data transmission to the one of the ONUs. In at least some example embodiments, a first of the ONUs is configured to forward error correct data for transmission to the OLT using FEC with an amount of, at least, one of puncturing and shortening differing from an amount of puncturing and shortening used for forward error correcting data for transmission to the OLT by a second of the ONUs. In at least some example embodiments, the optical fiber network is a passive optical network.

In at least some example embodiments, an apparatus includes a plurality of ONUs, an optical fiber network, and an OLT for transmitting and receiving data from the plurality of ONUs via the optical fiber network, wherein some of the ONUs are configured to forward error correct data for transmission to the OLT such that FEC codes for the data transmitted from a part of the some of the ONUs have different amounts of, at least, one of puncturing and shortening than others of the some of the ONUs, and wherein the OLT is configured to determine the amounts of the, at least, one of puncturing and shortening based on error statistics information collected at the OLT. In at least some example embodiments, the information is indicative of received error-cluster distributions for transmission from individual ones of the ONUs. In at least some example embodiments, the information is indicative of error-free run distributions of the data received from individual ones of the ONUs. In at least some example embodiments, the information is further indicative of received error-cluster distributions of the data received from the individual ones of the ONUs. In at least some example embodiments, the OLT is configured to transmit to, at least, one of the ONUs, information indicative of a selected FEC code for the data for transmission to the, at least, one of the ONUs (e.g., wherein the information received from ones of the ONUs is indicative of received error-cluster distributions at individual ones of the ONUs, wherein the information received from ones of the ONUs is indicative of error-free run distributions of the data received at individual ones of the ONUs, wherein the other information received from ones of the ONUs is indicative of error-free run distributions of the data received at the individual ones of the ONUs, or the like). In at least some example embodiments, the apparatus further includes the optical fiber network. In at least some example embodiments, the apparatus further includes the ONUs, wherein the ONUs are configured to transmit, to the OLT, information indicative of, at least, one of received error-cluster distributions of the data received at the ONUs and error-free run distributions of the data received at individual ones of the ONUs. In at least some example embodiments, the ONUs are configured to transmit, to the OLT, information indicative of both of received error-cluster distributions of the data received at the ONUs and error-free run distributions of the data received at the individual ones of the ONUs. In at least some example embodiments, the OLT is configured to transmit, to one of the ONUs, information indicative of a selected FEC code for data transmission to the one of the ONUs. In at least some example embodiments, a first of the ONUs is configured to forward error correct data for transmission to the OLT using FEC with an amount of, at least, one of puncturing and shortening differing from an amount of puncturing and shortening used for forward error correcting data for transmission to the OLT by a second of the ONUs. In at least some example embodiments, the optical fiber network is a passive optical network.

It will be appreciated that various other example embodiments for supporting collection of various types of channel characteristic information of a communication channel, for use in selection of various types of FEC settings for the communication channel, may be supported.

Figure 8:
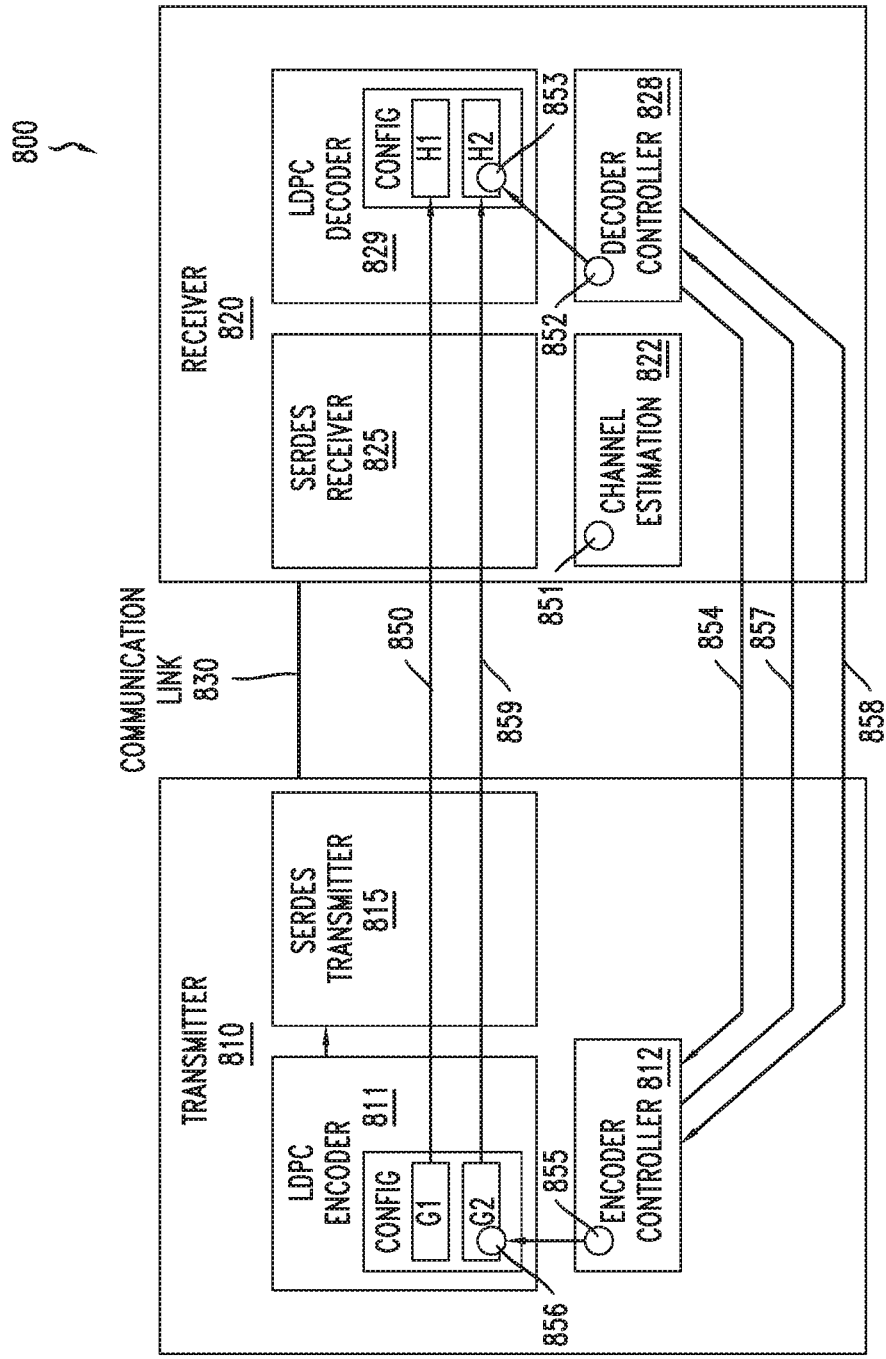
FIG. 8 depicts an example embodiment of a method to support FEC for communications from a transmitter to a receiver where the FEC is based on channel condition information of a channel from the transmitter to the receiver.

FIG. 8 depicts an example embodiment of a method to support FEC for communications from a transmitter to a receiver where the FEC is based on channel condition information of a channel from the transmitter to the receiver.

As illustrated in FIG. 8, the method 800 is described within the context of a transmitter-receiver system including a transmitter 810 and a receiver 820. The transmitter 810 includes an LDPC encoder 811 and a SERDES transmitter 815 and the receiver 820 includes a SERDES receiver 825 and an LDPC decoder 829. The LDPC encoder 811 encodes target data for transmission to the receiver 820 and provides the encoded data to the SERDES transmitter 815 for transmission to the SERDES receiver 825 via a communication link 830. The LDPC encoder 811 encodes the data based on an LDPC code that is used to provide FEC for the data communicated from the transmitter 810 to the receiver 820. The SERDES transmitter 815 receives the encoded data from the LDPC encoder 811 and transmits the encoded data to the SERDES receiver 825 via the communication link 830. The SERDES receiver 825 receives the encoded data from the SERDES transmitter 815 via the communication link 830 and provides the encoded data to the LDPC decoder 829. The LDPC decoder 829 receives the encoded data from the SERDES receiver 825 and decodes the encoded data to recover the target data. The LDPC decoder 829 decodes the data based on an LDPC code that is used to provide FEC for the data communicated from the transmitter 810 to the receiver 820. The receiver 820 also includes a channel estimator 822 and a decoder controller 828. The transmitter 810 also includes an encoder controller 812. As discussed further below, the transmitter 810 and the receiver 820 are configured to interact to support selection and use of the LDPC code that is used for FEC where the selection is based on the channel characteristic information of the channel between the transmitter 810 and the receiver 820 via the communication link 830.

It will be appreciated that the transmitter-receiver system depicted in FIG. 8 may be used within the context of the system 100 of FIG. 1 for supporting FEC for communications between the OLT 110 and an ONU 120. For example, for DS communications from the OLT 110 to an ONU 120, the transmitter 810 may be part of (or may be equated to the OLT 110) and the receiver 820 may be part of (or may be equated to) the ONU 120. Alternatively, for example, for US communications from an ONU 120 to the OLT 110, the transmitter 810 may be part of (or may be equated to the ONU 120) and the receiver 820 may be part of (or may be equated to) the OLT 110.

It will be appreciated that the transmitter-receiver system depicted in FIG. 8 may be used within various other contexts for supporting FEC for communications between a transmitter and a receiver.

At step 850, the transmitter 810 sends information to the receiver 820 by making use of an LDPC code that is characterized by a generator matrix G1 active at the LDPC encoder 811 of the transmitter 810 and a parity check matrix H1 active at the LDPC decoder 829 of the receiver 820. It will be appreciated that the LDPC code defined by H1, and for which the corresponding generator matrix G1 is used, may be considered to be a default LDPC code (e.g., a conservative code that will be modified in later steps based on the channel conditions).

At step 851, the receiver 820 estimates the channel conditions of the channel from the transmitter 810 to the receiver 820. The channel conditions that are estimated may include one or more of a transfer function, channel loss, noise characteristics, an error distribution (e.g., a received error-cluster distribution, an error-free run distribution, or the like), or the like, as well as various combinations thereof. The channel conditions are estimated by the channel estimator 822 and provided to the decoder controller 828.

At step 852, the decoder controller 828 constructs an optimal LDPC code based on the estimated channel conditions. The optimal LDPC code may be constructed based on progressive-edge-growth, techniques such as Density Evolution or EXIT chart analysis, or the like, as well as various combinations thereof. It will be appreciated that the construction of the optimal LDPC code based on the estimated channel conditions may be performed based on various types of optimization targets (e.g., throughput, power consumption, or the like, as well as various combinations thereof). In this example, the optimal LDPC code constructed by the decoder controller 828 is denoted as parity check matrix H2, which is different than the default LDPC code H1 currently active at the LDPC decoder 829 of the receiver 820.

At step 853, the LDPC decoder 829 receives the optimal LDPC code and stores the optimal LDPC code in a configuration area. The LDPC decoder 829 may support storage of multiple decoder configurations and the decoder controller 828 may select an idle configuration area of the LDPC decoder 829 as the location for storage of the optimal LDPC code.

At step 854, the decoder controller 828 communicates the optimal LDPC code to the encoder controller 812. The communication of the optimal LDPC code to the encoder controller 812 may include sending the actual parity check matrix H2 or an indication of the parity check matrix H2 (e.g., for a QC-LDPC code, the decoder controller 828 may send the compact matrix of this optimal LDPC code to the encoder controller 812). It will be appreciated that the communication of the optimal LDPC code from the receiver 820 to the transmitter 810 may be performed using IB or OOB messaging.

At step 855, the encoder controller 812 transforms the optimal LDPC code to a corresponding generator configuration. It will be appreciated that the transformation of the optimal LDPC code to the corresponding generator configuration may include building a generator matrix for the received parity check matrix. In this example, the generator matrix built by the encoder controller 812 based on the parity check matrix H2 is denoted as generator matrix G2, which is different than the default generator matrix G1 currently active at the LDPC encoder 811 of the transmitter 810.

At step 856, the LDPC encoder 811 receives the generator matrix G2 and stores the generator matrix G2 in a configuration area. The LDPC encoder 811 may support storage of multiple encoder configurations and the encoder controller 812 may select an idle configuration area of the LDPC encoder 811 as the location for storage of the generator matrix G2.

At step 857, the encoder controller 812 informs the decoder controller 828 that configuration of the LDPC encoder 811 for the optimal LDPC code is complete, such that the LDPC encoder 811 and LDPC decoder 829 may begin communicating based on the optimal LDPC code.

At step 858, the decoder controller 828 and the encoder controller 812 agree on when to perform a synchronous switchover from the first LDPC code (defined by H1) to the optimal LDPC code (defined by H2).

At step 859, after the synchronous switchover, the transmitter 810 sends information to the receiver 820 using the optimum LDPC code, characterized by H2.

It will be appreciated that various modifications (e.g., in terms of which elements perform which functions) are contemplated. For example, although primarily described with respect to example embodiments in which computation of the optimal LDPC code is performed on the receiver side by the receiver 820 (and, more specifically, by the decoder controller 828 of the receiver 820), in at least some example embodiments the computation of the optimal LDPC code may be performed by a different element of the receiver 820, may be performed by an element on the receiver side other than the receiver 820 (e.g., an external element running in a cloud environment or the like), may be performed on the transmitter side by the transmitter 810 (e.g., where the receiver 820 sends channel condition information to the transmitter 810 (e.g., from the decoder controller 828 to the encoder controller 812 or the like) for use by the transmitter 810 in computing the optimal LDPC code), may be performed on the transmitter side by an element on the transmitter side other than the transmitter 810 (e.g., an external element running in a cloud environment or the like) where such element may receive the channel condition information from the receiver 820 or from the transmitter 810 for use in computing the optimal LDPC code), may be performed by one or more elements not necessarily considered to be associated with the receiver side and/or the transmitter side (e.g., one or more centralized elements configured to communicate with both the receiver 820 and the transmitter 810), or the like, as well as various combinations thereof. For example, various other functions primarily presented herein as being performed by the receiver 820 on the receiver side may be performed by one or more other elements (e.g., one or more elements on the receiver side, one or more elements on the transmitter side, one or more elements not necessarily considered to be on the receiver side or the transmitter side, or the like, as well as various combinations thereof). For example, various other functions primarily presented herein as being performed by the transmitter 810 on the transmitter side (e.g., generator configuration computation) may be performed by one or more other elements (e.g., one or more elements on the transmitter side, one or more elements on the receiver side, one or more elements not necessarily considered to be on the transmitter side or the receiver side, or the like, as well as various combinations thereof). For example, various functions primarily presented herein as being performed elements of the transmitter 810 and elements of the receiver 820 may be performed by an element external to the transmitter 810 and the receiver 820 (e.g., a centralized control device, a centralized control function, a software defined physical layer paradigm, or the like) and in communication with the transmitter 810 and the receiver 820 for supporting selection of the optimal LDPC code (e.g., communicating with the channel estimator 822 for receiving channel status information which is used for selecting the optimal LDPC code) and configuration of the transmitter 810 and the receiver 820 to use the optimal LDPC code (e.g., communicating with the decoder controller 828 and the encoder controller 812 for informing them of the optimal LDPC codes, ordering them to update configuration areas of the LDPC decoder 829 and the LDPC encoder 811, respectively, ordering synchronous switching to use of the optimal LDPC code, and the like, as well as various combinations thereof). It will be appreciated that various other modifications (e.g., in terms of which elements perform which functions) are contemplated.

It will be appreciated that various other modifications (e.g., in terms of the number of LDPC codes supported, the type of FEC code used, and so forth) are contemplated. For example, in at least some example embodiments, the LDPC encoder 811 and the LDPC decoder 829 may be configured to support any LDPC code which may be used. For example, in at least some example embodiments, since support by the LDPC encoder 811 and the LDPC decoder 829 for any possible LDPC code which may be used may significantly increase the complexity of the LDPC encoder 811 and the LDPC decoder 829, various functions may be used to limit the number of possible LDPC codes which may be used while still providing flexibility to enable the LDPC encoder 811 and the LDPC decoder 829 to modify the LDPC code that is used based on channel conditions. For example, in at least some example embodiments, the number of possible LDPC codes may be limited by limiting one or more parameters of the LDPC codes (e.g., the maximum number of rows of the base H matrix, the maximum number of columns of the base H matrix, the lifting factor, or the like, as well as various combinations thereof) to reasonable ranges. For example, in at least some example embodiments, the number of possible LDPC codes may be limited by having the LDPC encoder 811 and the LDPC decoder 829 export and exchange the ranges of LDPC code parameters that they support (e.g., the LDPC encoder 811 sends the ranges of LDPC code parameters that it supports to the LDPC decoder and the LDPC decoder 829 sends the ranges of LDPC code parameters that it supports to the LDPC encoder 811) and then the computation of the optimal LDPC code may be performed based on the ranges of LDPC code parameters supported by the LDPC encoder 811 and the LDPC decoder 829, respectively (e.g., based on a common denominator for the supported encoder and decoder parameters). It will be appreciated that various other modifications (e.g., in terms of the number of LDPC codes supported, the type of FEC code used, and so forth) are contemplated.

It will be appreciated that use of the method 800 of FIG. 8, or other similar methods which may be provided within the same or different communications contexts, may provide various advantages or potential advantages. For example, it will be appreciated that various example embodiments presented with respect to the method 800 of FIG. 8 support operation of a transmitter/receiver system with an optimally constructed LDPC code, thereby supporting optimal or near-optimal use of the transmission channel (e.g., operation close to the capacity, or Shannon limit, of the transmission channel) since the LDPC code is tuned to the properties (e.g., channel loss, noise, and the like, as well as various combinations thereof) of the transmission channel. For example, it will be appreciated that, since construction of new LDPC codes may be resource intensive (e.g., time consuming), various example embodiments presented with respect to the method 800 of FIG. 8 may be particularly well-suited for use on communication interfaces where switchover operations are not expected to be performed frequently, such as on fiber interfaces (e.g., PON, point-to-point fiber, or the like) or other wired interfaces (e.g., high-speed Ethernet links or the like) since the channel conditions typically will not change drastically over short time periods on such interfaces. For example, it will be appreciated that various example embodiments presented with respect to the method 800 of FIG. 8 may obviate the need for a transmitter/receiver system to work with a single parity check matrix and accept its shortcomings under channel conditions that deviate from its design target, thereby enabling significant increases in net throughput under good channel conditions (e.g., over certain solutions in which the LDPC code is designed to support relatively bad channel conditions such that bits are wasted under good channel conditions). For example, it will be appreciated that various example embodiments presented with respect to the method 800 of FIG. 8 may obviate the need for a transmitter/receiver system to apply variable shortening and puncturing operations (which, although allowing tuning of the code rate R of the LDPC code such that the transmitter/receiver system can work under a wider range of operating conditions, may increase the gap to capacity and, thus, may result in sub-optimal solutions) on the LDPC codeword (although it will be appreciated that shortening and puncturing may be used in various example embodiments presented herein). For example, it will be appreciated that various example embodiments presented with respect to the method 800 of FIG. 8 may obviate the need for a transmitter/receiver system to specify multiple LDPC codes and various settings for puncturing and shortening the LDPC codes since, although allowing many combinations may allow operation of the transmission channel under near optimal conditions, allowing many such combinations also may increase the complexity of the system and requirements on the control mechanisms (although it will be appreciated that shortening and puncturing may be used in various example embodiments presented herein). It will be appreciated that use of the method 800 of FIG. 8, or other similar methods which may be provided within the same or different communications contexts, may provide various other advantages or potential advantages.

It will be appreciated that, although primarily presented herein with respect to example embodiments in which support for FEC is provided within the context of communication of data over a particular types of physical medium (namely, a PON), various example embodiments presented herein may be used, or adapted for use, within the context of communication of data over various other types of physical media. For example, various example embodiments presented herein may be used, or adapted for use, within the context of communication of data over various other types of wired media, such as other types of fiber networks (e.g., point-to-point fiber, or the like), Ethernet, DSL, cable (e.g., DOCSIS 3.1, DOCSIS 3.1 FDX, or the like), powerline communication (e.g., G.hn or the like), or the like, as well as various combinations thereof. For example, various example embodiments presented herein may be used, or adapted for use, within the context of communication of data over various other types of wireless media, such as cellular (e.g., 4G, 4G LTE, 5G or the like), WiFi, WiMAX, satellite, or the like, as well as various combinations thereof. It will be appreciated that various example embodiments presented herein may be used, or adapted for use, within the context of communication of data over various other types of physical media, interfaces, networks, or the like, as well as various combinations thereof.

Figure 9:
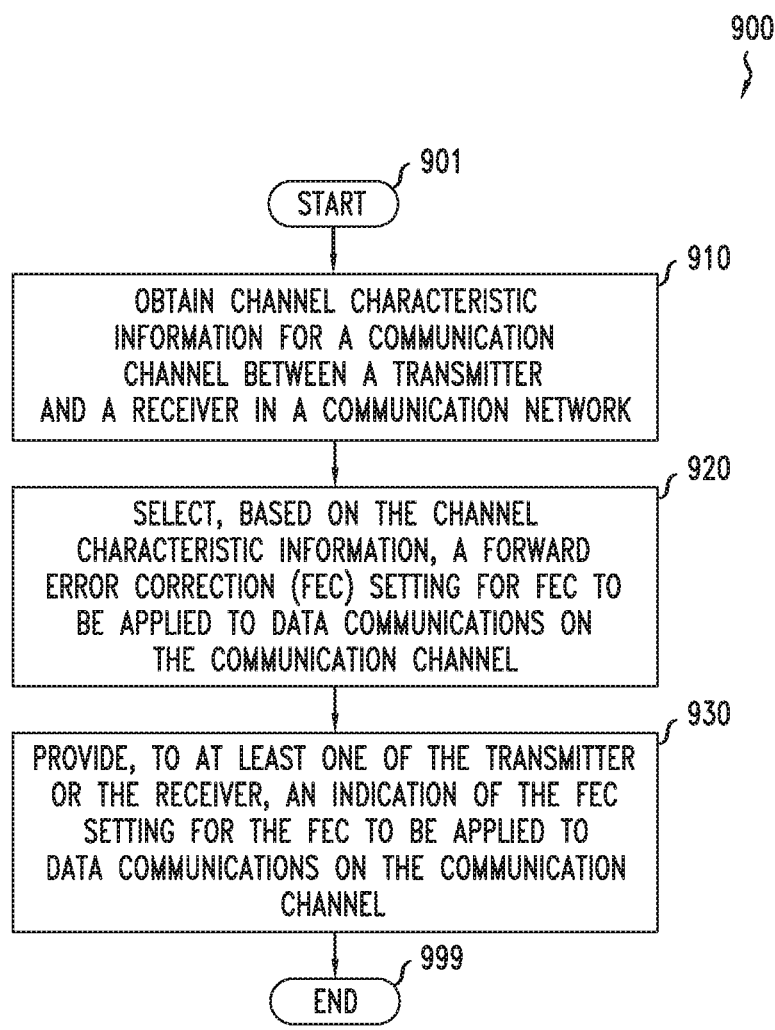
FIG. 9 depicts an example embodiment of a method for supporting FEC on a communication channel by controlling FEC settings of FEC for the communication channel based on channel characteristic information of the communication channel.

FIG. 9 depicts an example embodiment of a method for supporting FEC on a communication channel by controlling FEC settings of FEC for the communication channel based on channel characteristic information of the communication channel. It will be appreciated that, although primarily presented as being performed serially, at least a portion of the functions of method 900 may be performed contemporaneously or in a different order than as presented with respect to FIG. 9. At block 901, method 900 begins. At block 910, obtain channel characteristic information for a communication channel between a transmitter and a receiver in a communication network. At block 920, select, based on the channel characteristic information, a forward error correction (FEC) setting for FEC to be applied to data communications on the communication channel. At block 930, provide, to at least one of the transmitter or the receiver, an indication of the FEC setting for the FEC to be applied to data communications on the communication channel. At block 999, method 900 ends. It will be appreciated that the blocks of method 900 may be performed by one or more elements (e.g., an element of or associated with the transmitter, an element of or associated with the receiver, a central entity configured to communicate with either or both of the transmitter and the receiver, or the like, as well as various combinations thereof). It will be appreciated that various FEC support functions presented herein with respect to FIGS. 1-8 may be incorporated within the context of method 900 of FIG. 9.

Figure 10:
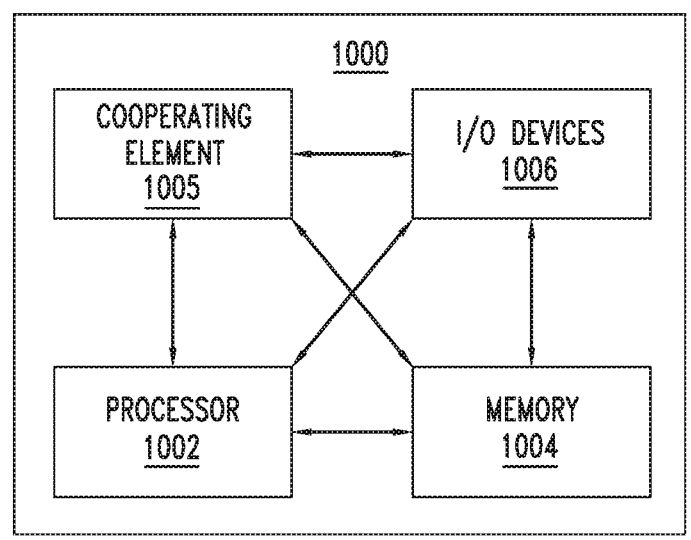
FIG. 10 depicts an example embodiment of a computer suitable for use in performing various functions presented herein.

Various example embodiments for supporting FEC on a communication channel, by controlling FEC settings of FEC for the communication channel based on channel characteristic information of the communication channel, may provide various advantages or potential advantages. For example, various example embodiments for supporting FEC on a communication channel may be configured to support improved evaluation of FEC code performance (e.g., based on evaluation of error distribution) over other mechanisms for FEC performance that are less accurate or even insufficient (e.g., obviating the need for use of gross metrics such as average BER at the decoder or distance/loss of optical link that are less suitable due to problems such as the presence of correlated errors), thereby supporting improved selection of FEC settings for the communication channel. For example, various example embodiments for supporting FEC on a communication channel, by controlling FEC settings of FEC for the communication channel based on channel characteristic information of the communication channel, may be configured to support improved FEC and, thus improved communication efficiency (e.g., improved throughput and so forth) for data communications on the communication channel. For example, various example embodiments for supporting FEC on a communication channel, by controlling FEC settings of FEC for the communication channel based on channel characteristic information of the communication channel, may be configured to support use of different FEC settings for different receivers served by a common transmitter in a P2MP communication context. For example, various example embodiments for supporting FEC on a communication channel, by controlling FEC settings of FEC for the communication channel based on channel characteristic information of the communication channel in a manner that supports use of different FEC settings for different receivers served by a common transmitter in a P2MP communication context, may obviate a need to operate the system with a single set of settings for all users where the single set of settings is designed to guarantee service for end users with the worst channel conditions (e.g., the most distance end users) and, thus, enables use of better service for end users with better channel conditions (e.g., in a 100G PON context, providing 95 Gbit/s maximum throughput to the closest end users, 85 Gbit/s maximum throughput to intermediate end users, and 75 Gbits/s maximum throughput to the farthest end users). Various example embodiments for supporting FEC on a communication channel, by controlling FEC settings of FEC for the communication channel based on channel characteristic information of the communication channel, may provide various other advantages or potential advantages FIG. 10 depicts an example embodiment of a computer suitable for use in performing various functions presented herein.

The computer 1000 includes a processor 1002 (e.g., a central processing unit (CPU), a processor, a processor having a set of processor cores, a processor core of a processor, or the like) and a memory 1004 (e.g., a random access memory, a read only memory, or the like). The processor 1002 and the memory 1004 may be communicatively connected. In at least some example embodiments, the computer 1000 may include at least one processor and at least one memory including computer program code, wherein the at least one memory and the computer program code are configured to, with the at least one processor, cause the computer to perform various functions presented herein.

The computer 1000 also may include a cooperating element 1005. The cooperating element 1005 may be a hardware device. The cooperating element 1005 may be a process that can be loaded into the memory 1004 and executed by the processor 1002 to implement various functions presented herein (in which case, for example, the cooperating element 1005 (including associated data structures) can be stored on a non-transitory computer-readable storage medium, such as a storage device or other suitable type of storage element (e.g., a magnetic drive, an optical drive, or the like)).

The computer 1000 also may include one or more input/output devices 1006. The input/output devices 1006 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1000 may represent a general architecture and functionality suitable for implementing functional elements described herein, portions of functional elements described herein, or the like, as well as various combinations thereof. For example, computer 1000 may provide a general architecture and functionality that is suitable for implementing one or more elements presented herein, such as OLT 110 or a portion thereof (e.g., a communication element 111, a control element 115, or the like, as well as various combinations thereof), an ONU 120 or a portion thereof (e.g., a communication element 121, a control element 125, or the like, as well as various combinations thereof), transmitter 810 or a portion thereof (e.g., LDPC encoder 811, SERDES transmitter 815, encoder controller 812, or the like, as well as various combinations thereof), receiver 820 or a portion thereof (e.g., SERDES receiver 825, LDPC decoder 829, channel estimator 822, decoder controller 828, or the like, as well as various combinations thereof), or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions. It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including instructions that, when executed by the at least one processor, cause the apparatus to at least:
obtain channel characteristic information for a communication channel between a transmitter and a receiver in a communication network;
select, based on the channel characteristic information, a forward error correction (FEC) setting for FEC to be applied to data communications on the communication channel; and
provide, to at least one of the transmitter or the receiver, an indication of the FEC setting for the FEC to be applied to data communications on the communication channel;
wherein the channel characteristic information comprises at least error modeling information based on modeling of probabilities of error events at the receiver;
wherein the error modeling information comprises a characterization of error correlation based on relative probabilities of consecutive error events referred to as error clusters;
wherein the error modeling information comprises information indicative of a received error-cluster distribution and information indicative of an error-free run distribution.

2. The apparatus of claim 1, wherein the channel characteristic information comprises at least one of transfer function information, channel loss information, noise characteristic information, or error information.

3. The apparatus of claim 1, wherein the error modeling information is based on an N-state Fritchman's Markov-chain model (FMM).

4. The apparatus of claim 1, wherein the channel characteristic information is obtained by determining the channel characteristic information at the apparatus based on a measurement performed on the communication channel.

5. The apparatus of claim 1, wherein the channel characteristic information is obtained by receiving the channel characteristic information from a remote element.

6. The apparatus of claim 1, wherein the FEC setting is selected by determining a FEC parameter for a current FEC code for the communication channel or determining a new FEC code for the communication channel.

7. The apparatus of claim 1, wherein the FEC setting comprises at least one of an amount of puncturing for a FEC code or an amount of shortening for a FEC code.

8. The apparatus of claim 1, wherein the FEC setting comprises at least one of a base FEC matrix or a full FEC matrix.

9. The apparatus of claim 1, wherein the FEC setting is selected based on evaluation of a set of FEC codes based on a target bit error rate (BER).

10. The apparatus of claim 1, wherein, to select the FEC setting, the instructions, when executed by the at least one processor, cause the apparatus to at least:

perform an evaluation of a set of low density parity check (LDPC) codes based on a target bit error rate (BER); and select one of the LDPC codes based on the evaluation of the set of LDPC codes based on the target BER.

11. The apparatus of claim 1, wherein the FEC setting is selected based on at least one of a boundary condition, a transmitter capability of the transmitter, or a receiver capability of the receiver.

12. The apparatus of claim 1, wherein the FEC setting comprises at least one of an amount of puncturing for a FEC code or an amount of shortening for a FEC code.

13. The apparatus of claim 1, wherein the indication of the FEC setting comprises at least one of the channel characteristic information, an indication of a FEC parameter for a FEC code, a FEC parameter for a FEC code, an indication of a FEC code, or a FEC code.

14. The apparatus of claim 1, wherein the communication network comprises an optical fiber network or a wireless network.

15. The apparatus of claim 1, wherein the communication network comprises a passive optical network (PON), wherein the communication channel is between an optical line terminal (OLT) and an optical network unit (ONU).

16. A non-transitory computer-readable medium storing computer program instructions which, when executed by an apparatus, cause the apparatus to at least:

obtain channel characteristic information for a communication channel between a transmitter and a receiver in a communication network;

select, based on the channel characteristic information, a forward error correction (FEC) setting for FEC to be applied to data communications on the communication channel; and provide, to at least one of the transmitter or the receiver, an indication of the FEC setting for the FEC to be applied to data communications on the communication channel;

wherein the channel characteristic information comprises at least error modeling information based on modeling of probabilities of error events at the receiver;

wherein the error modeling information comprises a characterization of error correlation based on relative probabilities of consecutive error events referred to as error clusters;

wherein the error modeling information comprises information indicative of a received error-cluster distribution and information indicative of an error-free run distribution.

17. A method, comprising:

obtaining channel characteristic information for a communication channel between a transmitter and a receiver in a communication network;

selecting, based on the channel characteristic information, a forward error correction (FEC) setting for FEC to be applied to data communications on the communication channel; and providing, to at least one of the transmitter or the receiver, an indication of the FEC setting for the FEC to be applied to data communications on the communication channel;

wherein the channel characteristic information comprises at least error modeling information based on modeling of probabilities of error events at the receiver;

wherein the error modeling information comprises a characterization of error correlation based on relative probabilities of consecutive error events referred to as error clusters;

wherein the error modeling information comprises information indicative of a received error-cluster distribution and information indicative of an error-free run distribution.

\* \* \* \* \*